US011432212B2

United States Patent
Jang et al.

(10) Patent No.: US 11,432,212 B2
(45) Date of Patent: Aug. 30, 2022

(54) METHOD AND APPARATUS FOR MINIMIZING INTERRUPTION TIME OF DATA TRANSFER ON HANDOVER IN WIRELESS COMMUNICATION NETWORK

(71) Applicant: Samsung Electronics Co., Ltd., Suwon-si (KR)

(72) Inventors: Chulhee Jang, Seoul (KR); Soenghun Kim, Suwon-si (KR); Eunyong Kim, Yongin-si (KR); Hwajin Cha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 16/944,792

(22) Filed: Jul. 31, 2020

(65) Prior Publication Data

US 2020/0367123 A1 Nov. 19, 2020

Related U.S. Application Data

(63) Continuation of application No. 16/072,300, filed as application No. PCT/KR2017/000562 on Jan. 17, 2017, now Pat. No. 10,764,799.

(30) Foreign Application Priority Data

Feb. 19, 2016 (KR) .......................... 10-2016-0019916

(51) Int. Cl.
*H04W 36/02* (2009.01)
*H04L 1/16* (2006.01)
(Continued)

(52) U.S. Cl.
CPC ........... *H04W 36/02* (2013.01); *H04L 1/1621* (2013.01); *H04W 36/0005* (2013.01);
(Continued)

(58) Field of Classification Search
CPC . H04W 36/02; H04W 36/0005; H04W 36/08; H04W 36/38; H04W 74/08;
(Continued)

(56) References Cited

U.S. PATENT DOCUMENTS

2003/0202489 A1 10/2003 Lee
2005/0272426 A1* 12/2005 Yang .............................. 455/436
(Continued)

FOREIGN PATENT DOCUMENTS

CN 101048001 A 10/2007
CN 101529816 A 9/2009
(Continued)

OTHER PUBLICATIONS

Chinese Office Action dated Jun. 11, 2021, issued in Chinese Application No. 201780011504.5.
(Continued)

*Primary Examiner* — Ajit Patel
*Assistant Examiner* — Wilfred Thomas
(74) *Attorney, Agent, or Firm* — Jefferson IP Law, LLP

(57) ABSTRACT

To solve the problem wherein a terminal cannot perform data communication from a network from the time point of a terminal receiving a handover command (HO command) message from a base station controlling a source cell to the time point of a terminal receiving a handover complete (HO complete) message from a base station controlling a target cell, after the terminal transmits the handover command message to the base station controlling the source cell, the base station controlling the source cell transmits to the base station controlling the target cell whether or not the terminal supports a function of reducing the interruption time of data transfer, the terminal continues to perform data transmission/reception with the base station controlling the source cell, and after the terminal completes a random access (Continued)

procedure with the base station controlling the target cell, the base station controlling the source cell transmits an additional sequence number status transfer message to the base station controlling the target cell.

20 Claims, 20 Drawing Sheets

(51) Int. Cl.

| | | |
|---|---|---|
| *H04W 36/00* | (2009.01) | |
| *H04W 36/08* | (2009.01) | |
| *H04W 36/38* | (2009.01) | |
| *H04W 74/08* | (2009.01) | |
| *H04W 88/02* | (2009.01) | |
| *H04W 88/08* | (2009.01) | |
| *H04W 80/08* | (2009.01) | |

(52) U.S. Cl.
CPC ........... *H04W 36/08* (2013.01); *H04W 36/38* (2013.01); *H04W 74/08* (2013.01); *H04W 74/0833* (2013.01); *H04W 88/02* (2013.01); *H04W 88/08* (2013.01); *H04W 80/08* (2013.01)

(58) Field of Classification Search
CPC . H04W 74/0833; H04W 88/02; H04W 88/08; H04W 80/08; H04W 36/18; H04L 1/1621
See application file for complete search history.

(56) References Cited

U.S. PATENT DOCUMENTS

| | | | |
|---|---|---|---|
| 2008/0095116 A1 | 4/2008 | Kim et al. | |
| 2008/0310367 A1 | 12/2008 | Meylan | |
| 2009/0061876 A1 | 3/2009 | Ho et al. | |
| 2009/0245204 A1 | 10/2009 | Voyer et al. | |
| 2009/0253434 A1 | 10/2009 | Hayashi et al. | |
| 2009/0268687 A1 | 10/2009 | Lee et al. | |
| 2010/0003981 A1* | 1/2010 | Ahluwalia | H04W 36/0055 455/436 |
| 2010/0067483 A1* | 3/2010 | Ahluwalia | H04L 1/1877 370/331 |
| 2012/0002643 A1* | 1/2012 | Chung | H04W 74/0833 370/331 |
| 2012/0218973 A1* | 8/2012 | Du | H04W 36/14 370/331 |
| 2013/0215822 A1* | 8/2013 | Worrall | H04L 47/34 370/315 |
| 2014/0092866 A1* | 4/2014 | Teyeb | H04W 36/0072 370/331 |
| 2014/0355569 A1* | 12/2014 | Chun | H04W 36/02 370/331 |
| 2015/0038148 A1* | 2/2015 | Park | H04W 36/08 455/437 |
| 2017/0019820 A1* | 1/2017 | Das | H04W 36/0016 |
| 2018/0049091 A1* | 2/2018 | Wang | H04W 88/06 |
| 2019/0059031 A1* | 2/2019 | Hahn | H04W 36/08 |
| 2019/0116541 A1* | 4/2019 | Hong | H04W 76/27 |

FOREIGN PATENT DOCUMENTS

| | | |
|---|---|---|
| CN | 101577946 A | 11/2009 |
| CN | 101772975 A | 7/2010 |
| CN | 103533586 A | 1/2014 |
| EP | 2 503 820 A1 | 9/2012 |
| KR | 10-2010-0053000 A | 5/2010 |
| KR | 10-2012-0023189 A | 3/2012 |
| WO | 2010/104365 A2 | 9/2010 |

OTHER PUBLICATIONS

Intel Corporation, ZTE, Nokia Networks, Huawei, "Text Proposal for Handover Latency Reduction Solutions", GPP TSG-RAN WG2 Meeting #92 R2-156921, Anaheim, California, Nov. 16-20, 2015, available on Nov. 20, J015.

Chinese Office Action dated Jul. 10, 2020, issued in Chinese Application No. 201780011504.5.

European Office Action dated Jul. 5, 2019, issued in European Patent Application No. 17753374.2.

3rd Generation Partnership Project; Technical Specification Group Radio Access Network; Evolved Universal Terrestrial Radio Access Network (E-UTRAN); X2 application protocol (X2AP) (Release 13), 3GPP Standard 3GPP TS 36.423, 3rd Eneration Partnership Project (3GPP), Mobile Competence Centre; 650, Route Des Lucioles; F-06921 Sophia-Antipolis Cedex; France, vol. RAN WG3, No. V13.2.0, Dec. 19, 2015 (Dec. 19, 2015), oa!les 1-230, XP051047146.

3rd Generation Partnership Project; Technical Specification Group Radio Access Network; Evolved Universal Terrestrial Radio Access (E-UTRA); Study on latency reduction techniques for LTE (Release 13), 3GPP DRAFT; R2-161869_ 36881-051, 3rd Generation Partnershit Project (3GPP), Mobile Competence Centre 650, Route Des Lucioles; F-06921 Sophia-Antipolis Cedex; France, Feb. 18, 2016 (Feb. 18, 2016), P051055653, Retrieved from http://www.3nnn_ora/ftp/Meetings 3GPP SYNC/RAN2/Docs/ on Feb. 18, 2016.

European Search Report dated Oct. 9, 2018, issued in European Patent Application No. 17753374.2.

'3GPP; TSG RAN; Evolved Universal Terrestrial Radio Access (E-UTRA); Study on latency reduction techniques for LTE (Release 13)', 3GPP TR 36.881 V0.5.0, 2015.12.04, Section 5.1.2, 8.3.2; Figure 5.1.2-1.

\* cited by examiner

METHOD AND APPARATUS FOR MINIMIZING INTERRUPTION TIME OF DATA TRANSFER ON HANDOVER IN WIRELESS COMMUNICATION NETWORK

CROSS-REFERENCE TO RELATED APPLICATION(S)

This application is a continuation application of prior application Ser. No. 16/072,300, filed on Jul. 24, 2018, which is a U.S. National Stage application under 35 U.S.C. § 371 of an International application number PCT/KR2017/000562, filed on Jan. 17, 2017, which was based on and claimed priority under 35 U.S.C § 119(a) of a Korean patent application number 10-2016-0019916, filed on Feb. 19, 2016, in the Korean Intellectual Property Office, the disclosure of which is incorporated by reference herein in its entirety.

TECHNICAL FIELD

The present invention relates to a method and apparatus for improving a cell switching procedure (i.e., handover procedure) of a terminal that cross a cell boundary in a cellular wireless communication network.

BACKGROUND ART

FIG. 1 is a diagram illustrating a handover (HO) procedure for serving-cell switching from a source cell to a target cell. Hereinafter, the source cell is interchangeably referred to as cell A 100, the target cell is interchangeably referred to as cell B 120, a base station hosting the cell A 100 is interchangeably referred to as enhanced node B (eNB) A 110, and a base station hosting the cell B is interchangeably referred to as eNB B 130.

If a terminal (interchangeable referred to as mobile terminal and user equipment (UE)) moves from one cell to another across a cell boundary, the cellular wireless communication system performs a HO procedure for switching the serving cell from a source cell to a target cell. In an exemplary 3GPP LTE network system as depicted in FIG. 1, if a UE 140 moves from the cell A 100 to the cell B 120, the eNB A 100 performs the HO of the UE 140 to the eNB B 130.

FIG. 2 is a signal flow diagram illustrating a schematic HO procedure in a long term evolution (LTE) system.

In FIG. 2, if the eNB A 110 sends the eNB B 120 a HO request message to request at step S200, the eNB B 130 determine whether it can accept the request and, if so, sends the eNB A 110 a HO request acknowledgement (ACK) message, at step S210, to accept the HO request. The eNB A sends the UE 140 a HO command message, at step S220, to instruct to switch its serving cell to the cell B 120 and sends, at step S230, the eNB B 130 a sequence number (SN) status transfer message carrying the information about downlink (DL)/uplink (UL) data for data forwarding to the eNB B 130 at step S240. Upon receipt of the HO command message, the UE 140 stops data communication with the cell A 100 and initiates a procedure for a call connection to the cell B 120. In this procedure, the UE performs a random access procedure by sending a random access channel (RACH) to the eNB B 120 at step S250, and the eNB B 130 sends a random access response (RAR) message in reply at step S260. Finally, the UE 140 sends the eNB B 120 a HO complete message to compete the HO procedure with successful serving cell switching to the cell B 120. Afterward, the UE resumes data communication via the cell B 120.

DISCLOSURE OF INVENTION

Technical Problem

In the conventional LTE HO scheme, however, the UE has to suspend data communication with the network until the eNB B receives the HO complete message from the UE since the time point when the UE receives the HO command message from the eNB A. Such a data communication suspension period is referred to as data interrupt time. In the LTE system where the data transfer interruption time mounts typically up to a few milliseconds, if the UE on which an application interacting with the network in real time moves across a cell boundary (requiring a handover), this means that the real-time interaction with the network becomes impossible during the data transfer interruption time. For example, if the UE moves across cell boundaries frequently in the course of receiving a cloud game service, it may be difficult to expect a smooth progress of the game or any real-time call or conference requiring real-time video transfer.

With the trend of miniaturization and compactification of future networks, the number of times of cell boundary crossings will increase, which will be likely to be one of the main causes making it difficult to guarantee real-time interaction with the network in combination with the data transfer interruption time of the current LTE technology.

Solution to Problem

In accordance with an aspect of the present invention, a handover method of a base station controlling a source cell includes transmitting a handover command to a terminal, transmitting a sequence number status transfer message and information indicating whether the terminal supports a data transfer interruption time reduction function to a base station controlling a target cell, and communicating a data packet with the terminal, wherein the terminal communicates the data packet with the base station controlling the source cell and, simultaneously, performs a random access procedure with the base station controlling the target cell.

In accordance with another aspect of the present invention, a handover method of a base station controlling a target cell includes receiving a sequence number status transfer message and information indicating whether a terminal supports a data transfer interruption time reduction function from a base station controlling a source cell and performing a random access procedure with the terminal, wherein the terminal communicates a data packet with the base station controlling the source cell and, simultaneously, perform the random access procedure with the base station controlling the target cell.

In accordance with another aspect of the present invention, a handover method of a terminal being handed over from a source cell to a target cell includes receiving a handover command from a base station controlling a source cell, performing, after receiving the handover command, a random access procedure with a base station controlling a target cell at the same time as communicating a data packet with the base station controlling the source cell, and transmitting, after completing the random access procedure, a handover complete message to the base stations controlling the source and target cells.

In accordance with another aspect of the present invention, a base station controlling a source cell for a handover includes a transceiver configured to communicate signals with a terminal and a base station controlling a target cell and a controller configured to control to transmit a sequence number status transfer message and information indicating whether the terminal supports data transfer interruption time reduction function to the base station controlling the target cell, communicate a data packet with the terminal, receive a handover complete message from the terminal or a terminal (UE) context release from the base station controlling the target cell, and transmit an additional sequence number status transfer message to the base station controlling the target cell after receiving the handover complete message or the terminal context release message, wherein the terminal communicates the data packet with the base station controlling the source cell and, simultaneously, performs a random access procedure with the base station controlling the target cell simultaneously, and the additional sequence number status transfer message includes information related to data packets communicated with the terminal after transmitting the sequence number status transfer message.

In accordance with another aspect of the present invention, a base station controlling a target cell for a handover includes a transceiver configured to communicate signals with a base station controlling a source cell and a terminal and a controller configured to control to receive a sequence number status transfer message and information indicating whether a terminal supports a data transfer interruption time reduction function from a base station controlling a source cell and perform a random access procedure with the terminal, wherein the terminal communicates a data packet with the base station controlling the source cell and, simultaneously, performs the random access procedure with the base station controlling the target cell.

In accordance with still another aspect of the present invention, a terminal being handed over from a source cell to a target cell includes a transceiver configured to communicate signals with a base station controlling a source cell and a base station controlling a target cell and a controller configured to control to receive a handover command from a base station controlling a source cell, perform, after receiving the handover command, a random access procedure with a base station controlling a target cell at the same time as communicating a data packet with the base station controlling the source cell, transmit, after completing the random access procedure, a handover complete message to the base stations controlling the source and target cells, receive, if the data packet is a downlink data packet, the data packet from the base station controlling the target cell after the base station controlling the target cell receives an additional sequence number status transfer message, and transmit, if the data packet is a uplink data packet, the data packet to the base station controlling the target cell after transmitting the handover complete message, wherein the estimated sequence number status information is information related to a sequence number of a data packet predicted to be transmitted from the base station controlling the source cell to the terminal before receiving the handover complete message.

Advantageous Effects of Invention

According to an embodiment of the present invention, it may be possible to provide a method and apparatus for minimizing the data interrupt time for a UE to perform a HO in a cellular wireless communication network.

MODE FOR THE INVENTION

Figure 1:
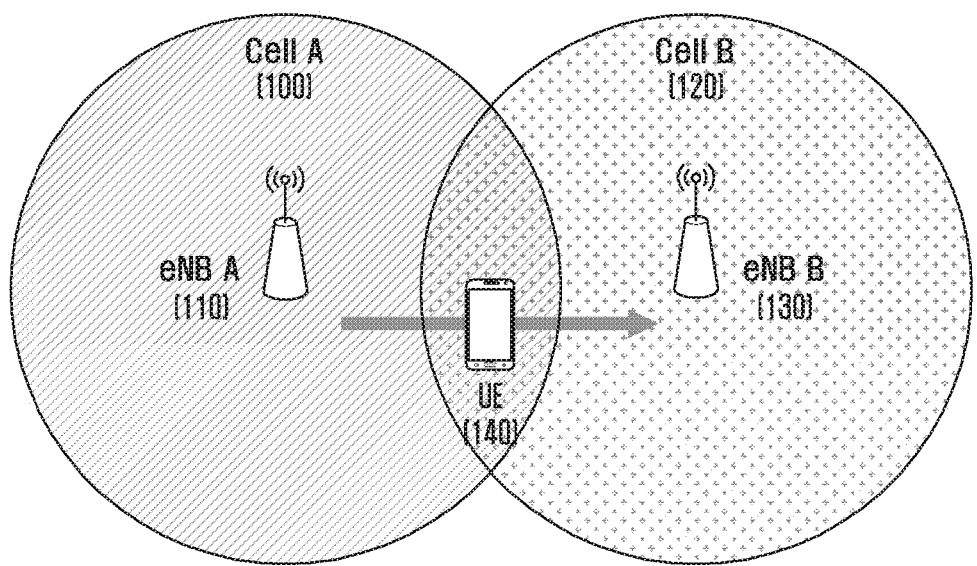
FIG. 1 is a diagram illustrating a handover (HO) procedure for serving-cell switching from a source cell to a target cell.
Figure 2:
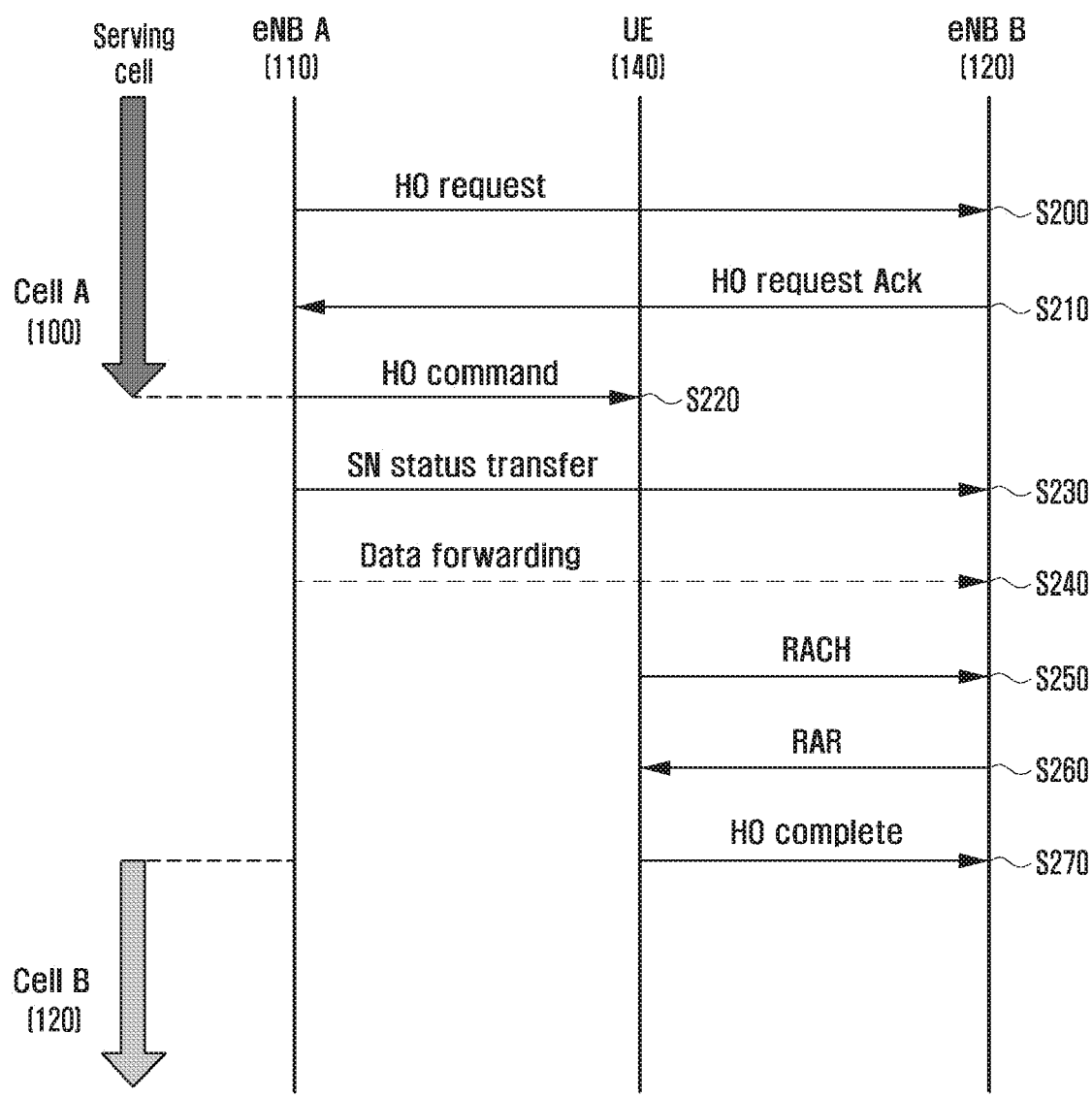
FIG. 2 is a signal flow diagram illustrating a schematic HO procedure in a long term evolution (LTE) system.

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the description is directed to an orthogonal frequency division multiplexing-based (OFDM-based) radio communication system, particularly a 3$^{rd}$ generation partnership project (3GPP) LTE and LTE-Advanced (LTE-A) standard, it will be understood by those skilled in the art that the present invention can be applied even to other communication systems having the similar technical background and channel format, with a slight modification, without departing from the spirit and scope of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

Figure 3:
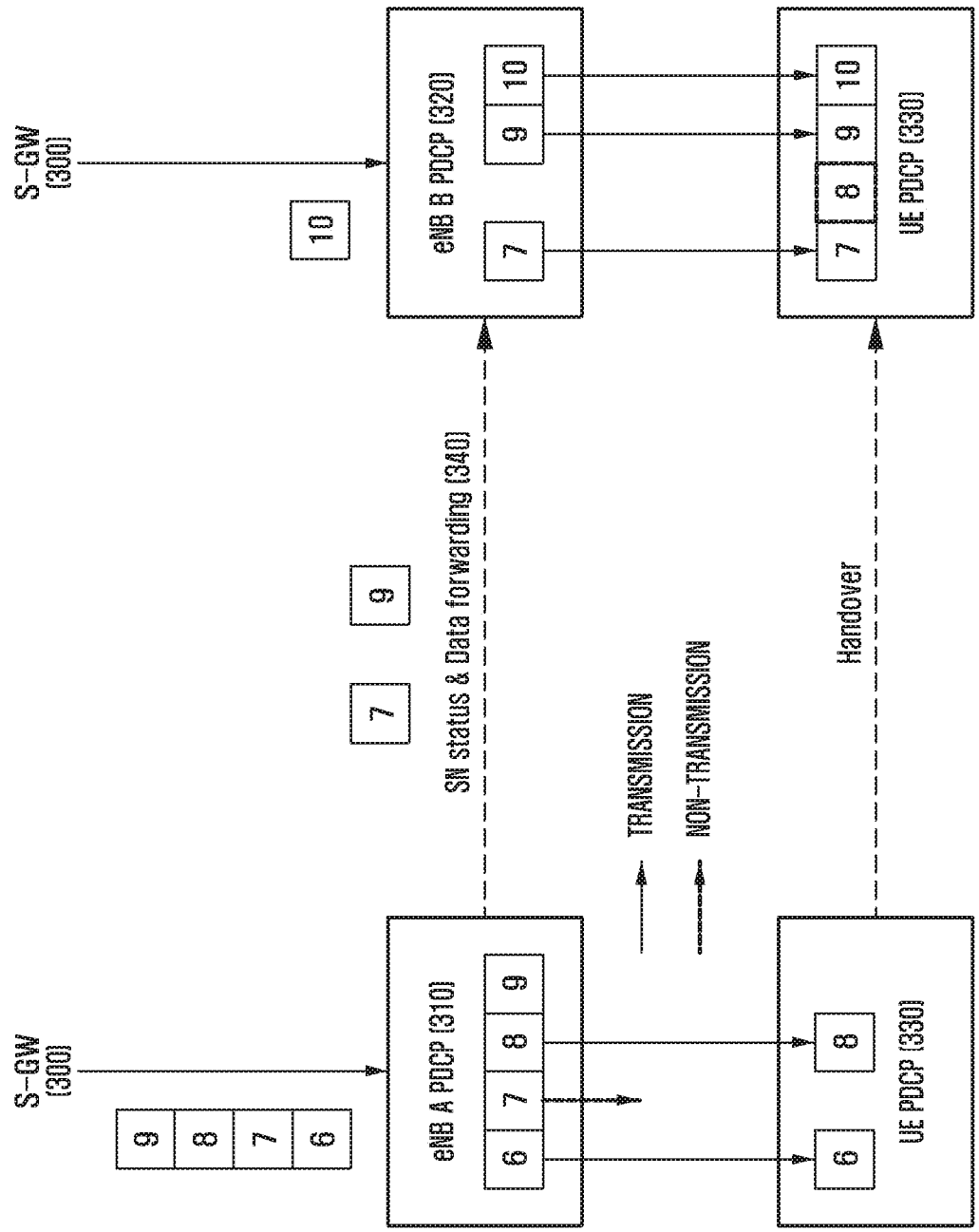
FIG. 3 is a diagram illustrating a DL data radio bearer (DRB) operation for a HO when a radio link control (RLC) layer operates in an acknowledged mode (AM)

FIG. 3 is a diagram illustrating a DL data radio bearer (DRB) operation for a HO when a radio link control (RLC) layer operates in an acknowledged mode (AM).

In reference to FIG. 3, data forwarding is performed in a packet data convergence protocol (PDCP) layer during a HO procedure, and a PDCP layer 310 of the eNB A forwards a PDCP service data unit (SDU) (hereinafter, interchangeably referred to as data packet) that has been received from a serving gateway (S-GW) 300 and then transmitted to the UE but no ACK corresponding thereto has been received, i.e., PDCP SDU 7 in FIG. 3, and a PDCP SDU of which transmission is not attempted yet, i.e., PDCP SDU 9 in FIG. 3, to a PDCP layer 320 of the eNB B. The eNB B transmits all PDCP SDUs received through data forwarding to the PDCP layer 330 of the UE.

Figure 4:
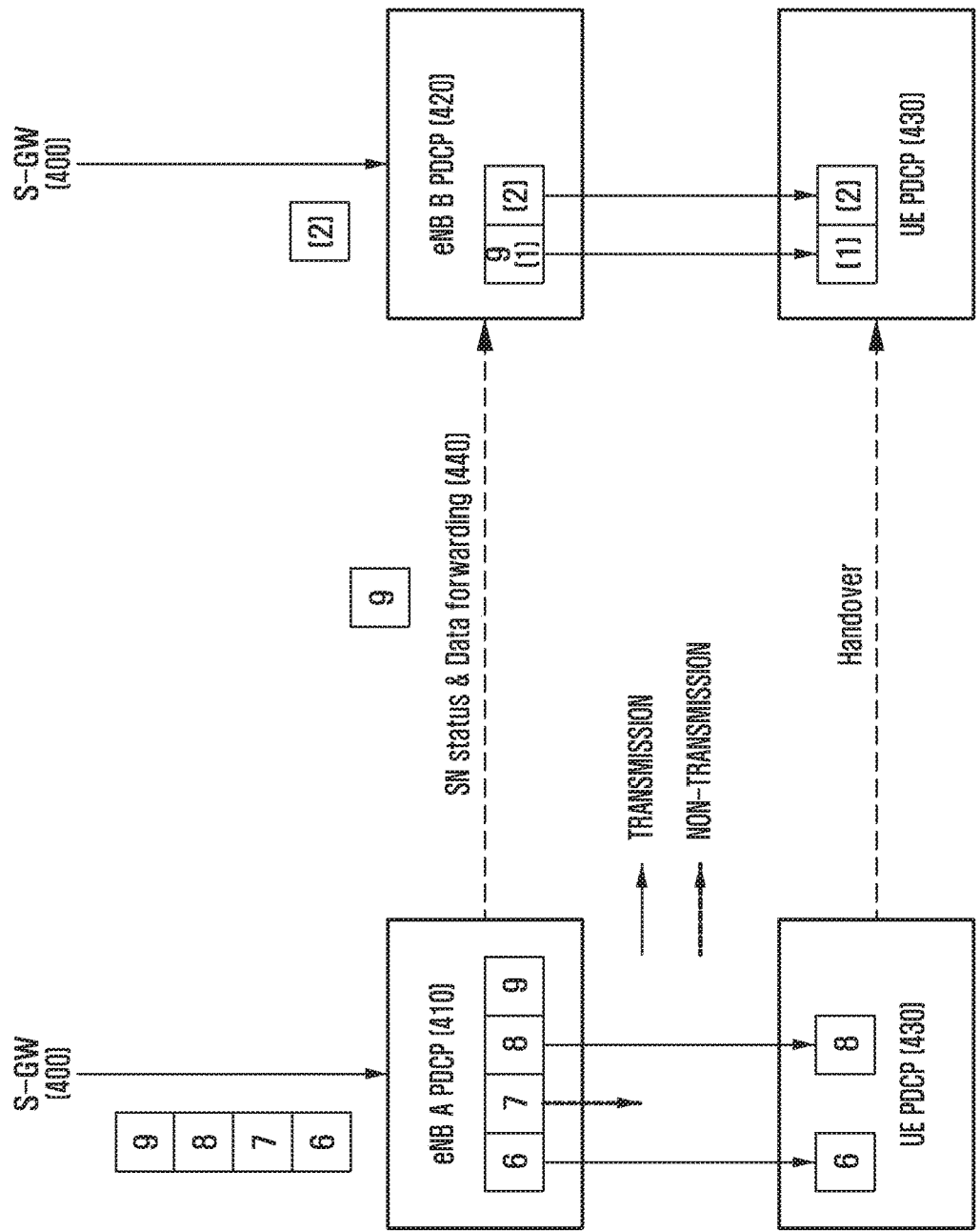
FIG. 4 is a diagram illustrating a DL DRB operation for a HO when an RLC layer operates in an unacknowledged mode (UM)

FIG. 4 is a diagram illustrating a DL DRB operation for a HO when an RLC layer operates in an unacknowledged mode (UM).

In reference to FIG. 4, a PDCP layer 410 of the eNB A forwards only the PDCP PDU of which transmission is not attempted yet, i.e., PDCP PDU 9 in FIG. 4, to a PDCP layer 420 of the eNB B regardless of the success/failure of previous data transmission unlike the case of FIG. 3. The eNB B transmits all of the PDCP SDUs received through the data forwarding to the PDCP layer 420 of the UE after the completion of the HO procedure.

Figure 5:
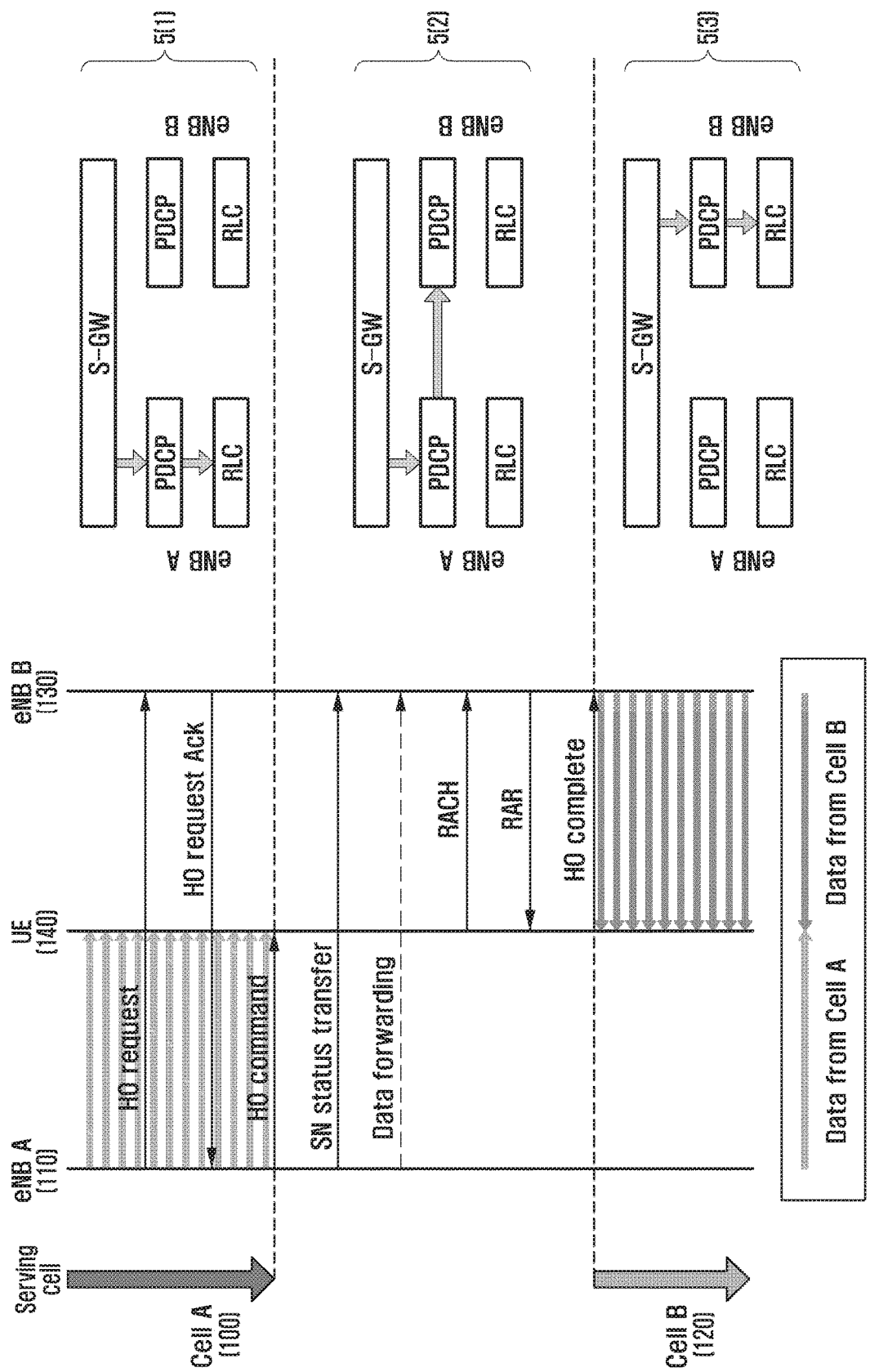
FIG. 5 is a diagram illustrating a DL traffic flow in a HO procedure.

FIG. 5 is a diagram illustrating a DL traffic flow in a HO procedure.

In reference to FIG. 5, the UE 140 receives data from the eNB A 110 until the HO command message is received from the eNB A 110 and, at this time, the data flows from the S-GW to the UE 140 through the PDCP and RLC layers of the eNB A 110. This traffic flow is denoted by reference number 5(1) in FIG. 5.

The UE 140 cannot receive the data from the network during a period between a time point when the UE 140 receives a HO command message and a time point when the eNB B 130 receives a HO complete message from the UE 140, and the data transmitted from the S-GW to the PDCP layer of the eNB A 110 during this period are forwarded to the PDCP layer of the eNB B 130. This traffic flow is denoted by reference number 5(2) in FIG. 5.

Since the time point when the eNB B 130 receives the HO complete message from the UE 140, the data flows from the S-GW to the PDCP layer of the eNB B and then to the UE 140 through the RLC layer of the eNB B 130.

Figure 6:
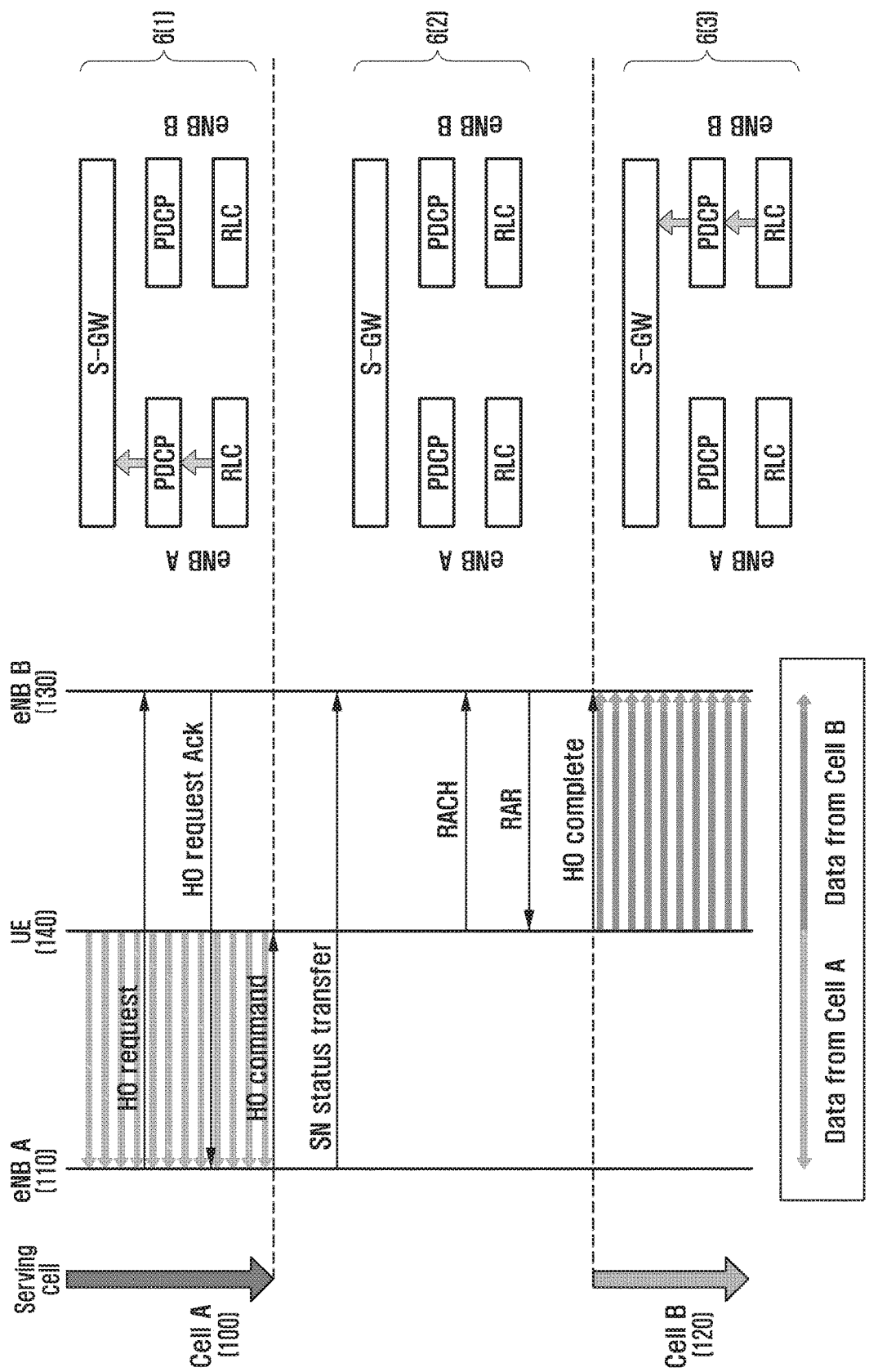
FIG. 6 is a diagram illustrating UL traffic flow in a HO procedure.

FIG. 6 is a diagram illustrating UL traffic flow in a HO procedure.

In accordance with FIG. 6, the UE 130 transmits data to the eNB A 110 until it receives a HO command message from the eNB A 110, and the UL data flow to the S-GW through the RLC and PDCP layers of the eNB A 110. This traffic flow is denoted by reference number 6(1) of FIG. 6.

The UE 140 cannot transmit data to the network during a period between a time point when it receives a HO command message and a time point when the eNB B 130 receives a HO complete message from the UE 140. This traffic flow is denoted by reference number 6(2) in FIG. 6.

Since the time point when the eNB B 130 receives the HO complete message from the UE 140, the UE 140 transmits the UL data via the eNB 130, and the data flows to the S-GW through the RLC and PDCP layers of the eNB B. This traffic flow is denoted by reference number 6(3) in FIG. 6.

Figure 7:
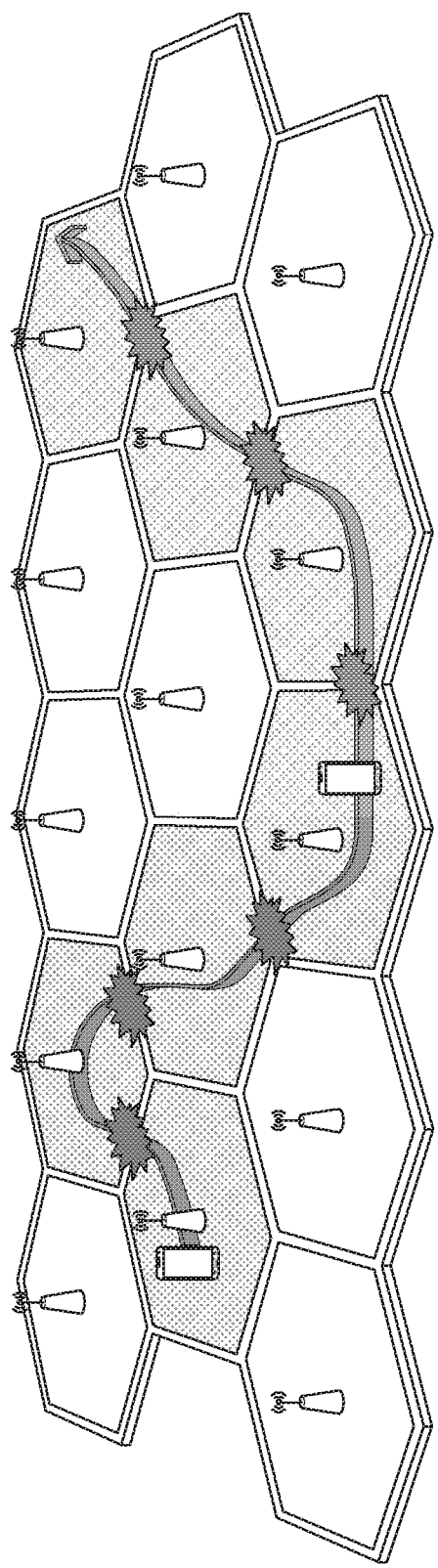
FIG. 7 is a diagram illustrating an example of a UE crossing cell boundaries.

According to the legacy LTE HO scheme designed to operate as described with reference to FIGS. 5 and 6, the UE cannot perform data communication with the network until the eNB B receives the HO complete message since the UE has received the HO command message from the eNB A. Particularly when the UE crosses cell boundaries frequently as shown in FIG. 7, the problem becomes worse. Therefore, the present invention aims to provide a method and apparatus for minimizing the data transfer interruption time during a UE handover in a cellular wireless communication network.

Figure 8A:
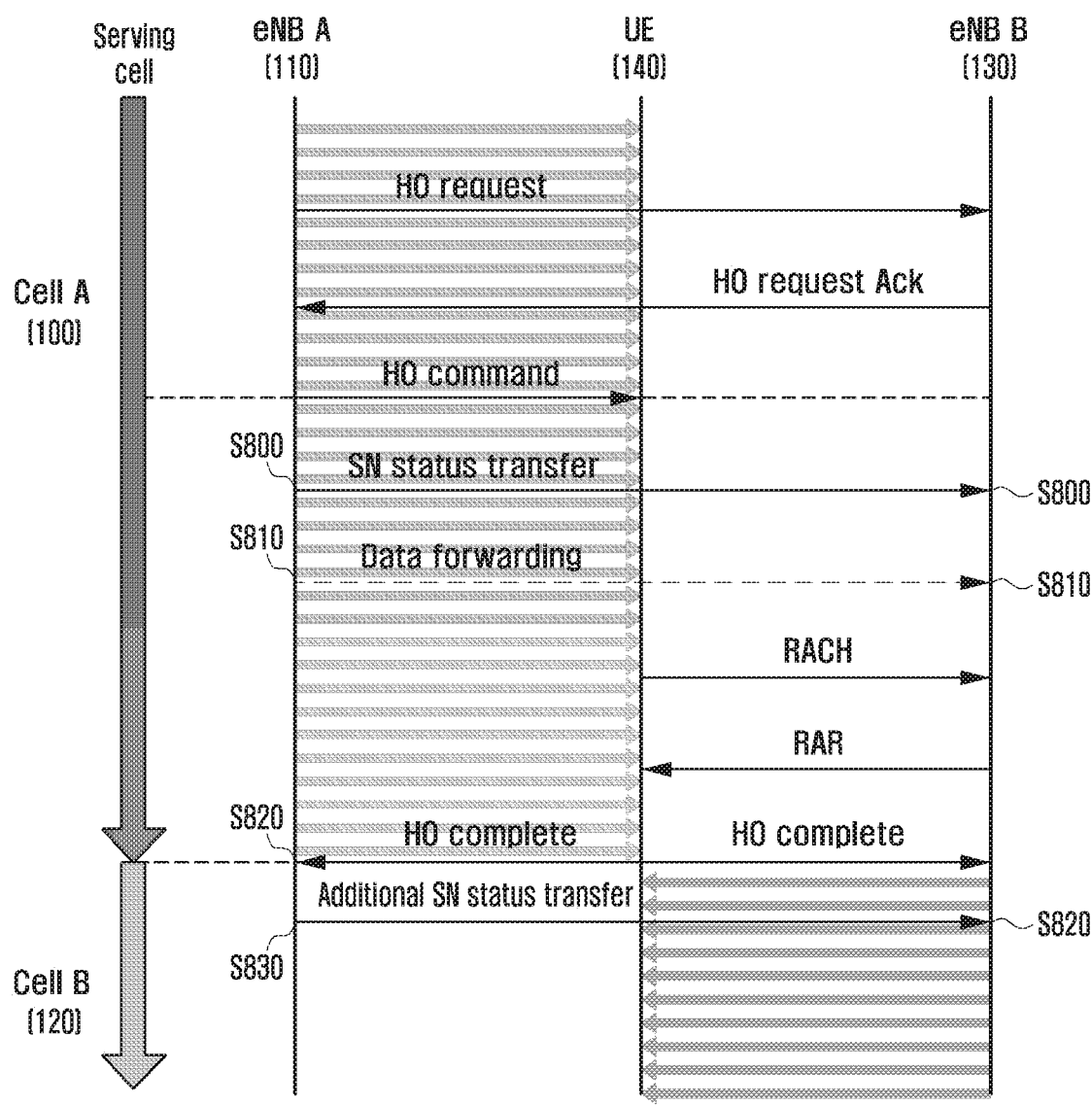
FIGS. 8A and 8B are diagrams illustrating a HO procedure and a DL data flow during the HO procedure according to an embodiment of the present invention.
Figure 8B:
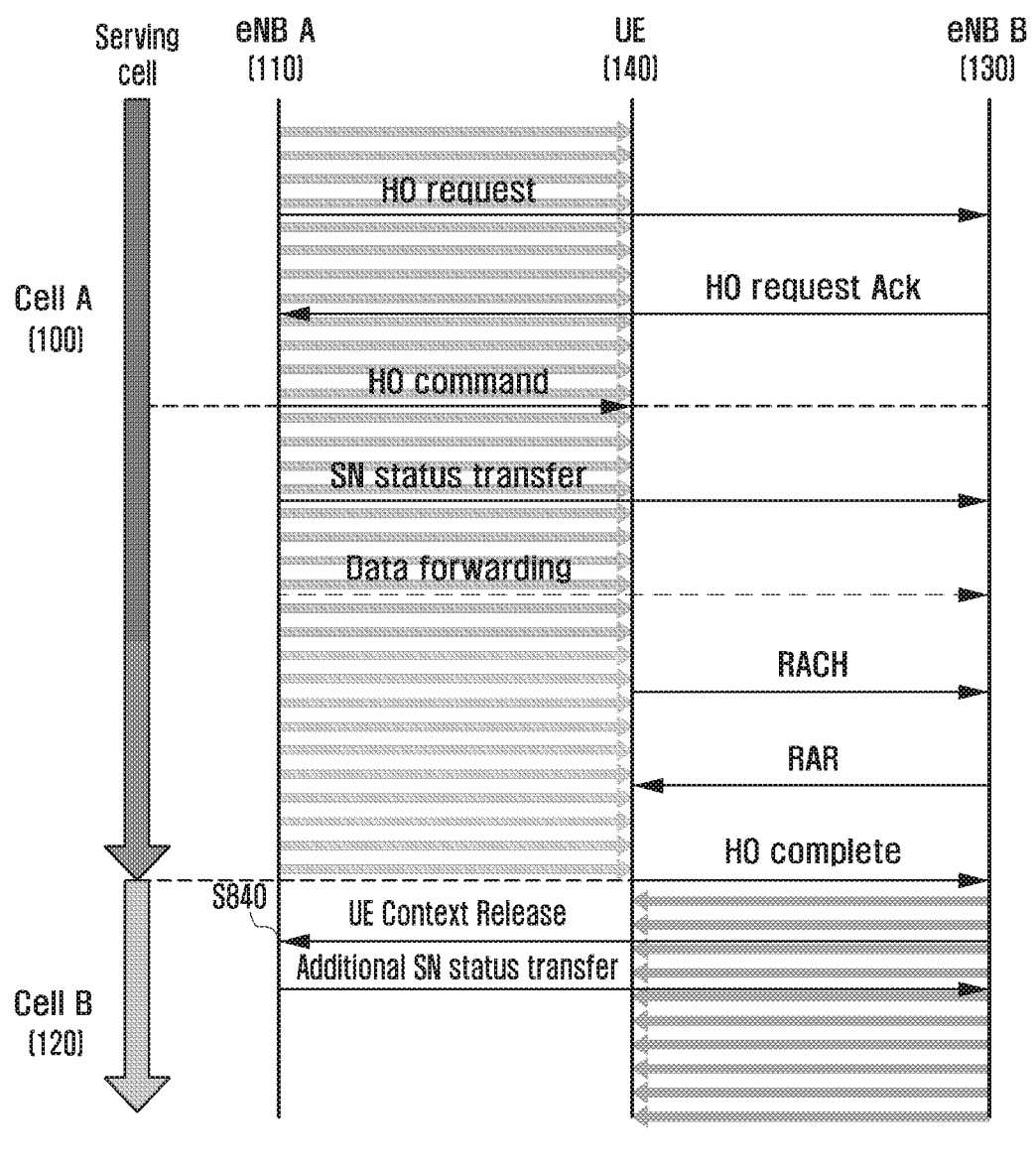

FIGS. 8A and 8B are diagrams illustrating a HO procedure and a DL data flow during the HO procedure according to an embodiment of the present invention.

In the embodiment of FIG. 8A, a UE 140 continues data communication with its old serving cell (in this case, cell A 100), even after receiving a HO command message from eNB A 110, and simultaneously performs a call connection procedure to connect to cell B 120. That is, the UE 140 may attempt a random access to the cell B 120, receive an RAR in reply, exchange additionally necessary information, and finally send a HO complete message to the eNB A 110 and eNB B 130, in the course of the data communication with the cell A 100. In the embodiment of FIG. 8B, the UE 140 may send the HO complete message only to the eNB B 130, and then the eNB B 130 may send the eNB A 110 a UE context release message to the eNB A 110 at step S840.

Then, the UE starts data communication with the cell B 120, and the eNB A 110 sends a sequence number (SN) status transfer message for the data addressed to the UE 140 to the eNB B 130; this scheme may reduce the data transfer interruption time during the HO for the UE dramatically. However, such a procedure is applicable to only the UEs that supports a data transfer interruption time reduction function, the legacy HO scheme is applied to the UEs that do not support the data transfer interruption time reduction function.

According to an embodiment of the present invention, a UE transmit signals to two eNBs simultaneously as described above and, in order to accomplish this, it has to activate two radio frequency (RF) units and signal processing units. This is similar to the case of activating two or more RF units and signal processing units for a primary cell (PCell) and secondary cell (SCell) in a carrier aggregation (CA) mode but differs in terms of processing signals on the same frequency from the CA mode.

According to an embodiment of the present invention, the UE 140 determines whether it supports the data transfer interruption time reduction function and whether the information on estimated SN status (N) is transmitted from the eNB A 110 to the eNB B 130 in the course of data forwarding at step S810 or SN status transfer message transmission at step S800 abiding by the HO procedure of the legacy standard. The estimated NS status (N) indicates the NS status of a PDCP SDU that is estimated to be transmitted from the eNB A 110 to the UE 140 until the time point of receiving the HO complete message, and it is determined based on a sequence number of the earliest PDCP SDU ($N_o$) remaining in the eNB A 110, the average data rate ($R_A$) (downlink data rate to the UE) of the eNB A 110, and latency ($T_{HO}(eNB_A, eNB_A)$) from the data forwarding to the HO complete message reception during the HO from the eNB A 110 to the eNB B 130 as expressed by [Equation 1].

$$N = f(N_O, R_A, T_{HO}(eNB_A, eNB_A))$$ [Equation 1]

Unlike the legacy HO procedure in which the PDCP SDUs remaining in the eNB A after the data forwarding are discard, the PDCP SDUs, in an embodiment of the present invention, are transmitted, rather than being discarded, to the UE until the data communication between the eNB A and the UE is broken or the eNB A receives the HO complete message from the UE at step S820 (or UE context release message from the eNB B that has received the HO complete message from the UE). Then, the eNB A 110 sends the eNB B 130 an additional SN status transfer message at step S830. The additional SN status transfer message includes the information on the SN of the PDCP SDU that is indicated as a missing PDCP PDU for the UE and, afterward, determined as a PDCP PDU received by the UE. In the AM mode, the eNB A 110 makes a notification to the eNB B 130 reflecting all of positive/negative acknowledgements (ACK/NACK); in the UM mode, the eNB A 110 makes a notification to the eNB B 130 of the last PDCP SDU it has transmitted, immediately upon receipt of the HO complete message from the UE 140.

The eNB B 130 starts transmitting data to the UE 140 after receiving the HO complete message or transmitting the UE context release message, from the PDCP SDU with the SN (N+δ) at the eNB A 110 rather than the PDCP SDU with the earliest SN at the eNB B. Here, δ is a predetermined integer constant. That is, δ may be set to 0 and a negative number. After receiving the additional SN status transfer message from the eNB A 110, the eNB B 130 discards the PDCP SDUs that have been already transmitted from the eNB A 110 to the UE 140 based on the additional SN status information and starts transmission from the PDCP SDU with the earliest SN remaining after the discard. It may also be possible for the eNB B 130 to wait for the additional SN status transfer message from the eNB A 110, after the receipt of the HO complete message, and start transmission to the UE 140 from the PDCP SDU with the earliest SN by reflecting the information carried by the additional SN status transfer message.

Figure 9:
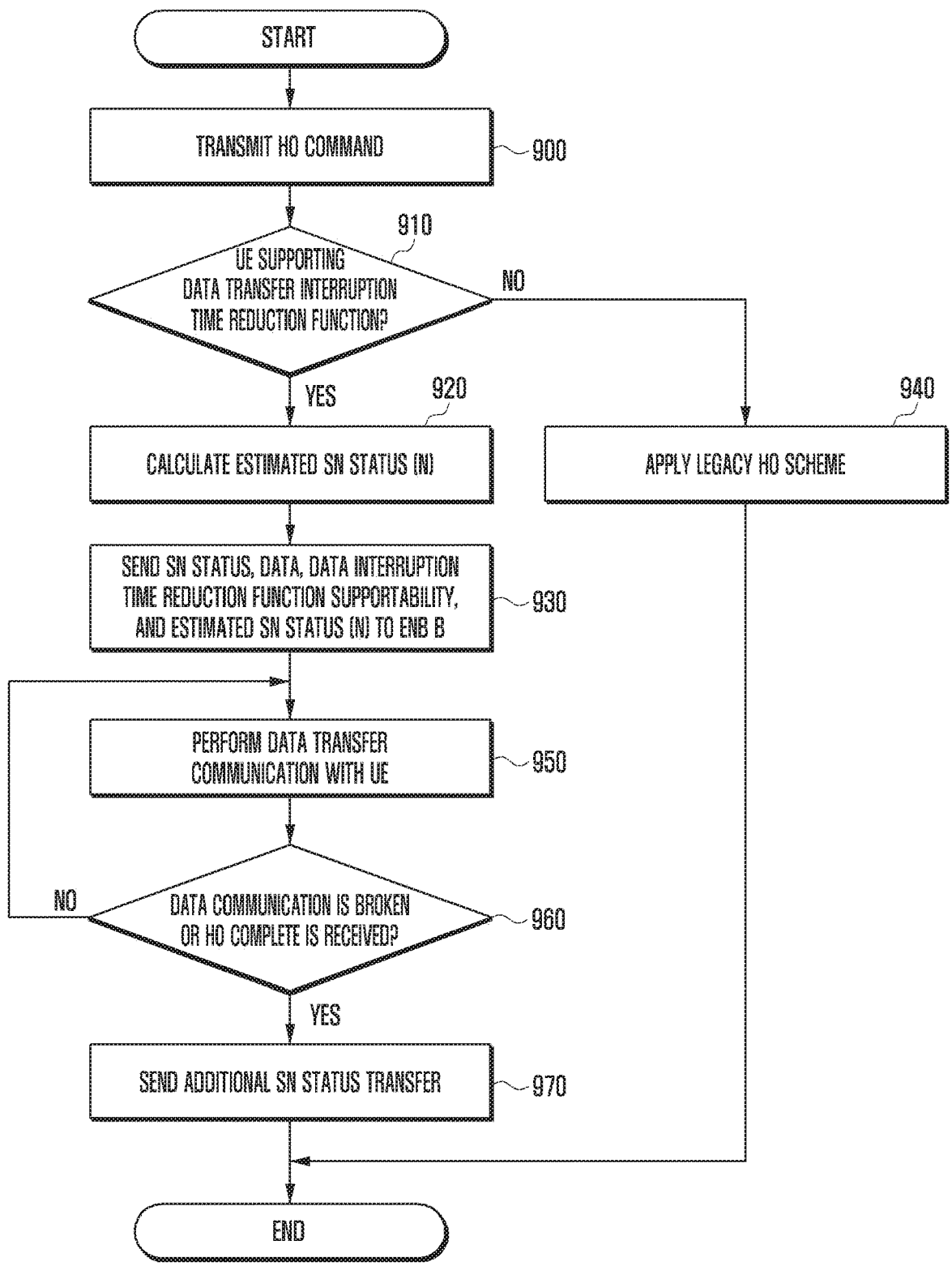
FIG. 9 is a flowchart illustrating an DL traffic transmission operation of the eNB A 110 during a HO.

FIG. 9 is a flowchart illustrating a DL traffic transmission operation of the eNB A 110 during a HO.

In reference to FIG. 9, the eNB A 110 sends n HO command to the UE 140 at step 900. Next, the eNB A determines at step 910 whether the corresponding UE supports a data transfer interruption time reduction function. If the UE supports the data transfer interruption time reduction function, the eNB A calculates an estimated NS status at step 920 as described above and, at step 930, sends the eNB B 130 the SN status, data, estimated SN status, and information indicating whether the corresponding UE supports the data transfer interruption time reduction function.

Next, the eNB A performs data communication with the UE at step 950, determines at step S960 whether a HO complete message is received, sends, if the HO complete message is received, the eNB B an additional SN status transfer message at step 970, and continues, if the HO complete message is not received, the data communication with the UE at step 950.

If it is determined that the UE does not support the data transfer interruption time reduction function, a legacy HO scheme is applied to the HO for the UE between the eNB A and the eNB B at step 940.

The UE may send the eNB A the UE capability including information indicating whether it supports the data transfer interruption time reduction function when it accesses the eNB A, or the eNB A may receive the information indicating whether the UE supports the data transfer interruption time reduction function from a mobility management entity (MME).

Figure 10:
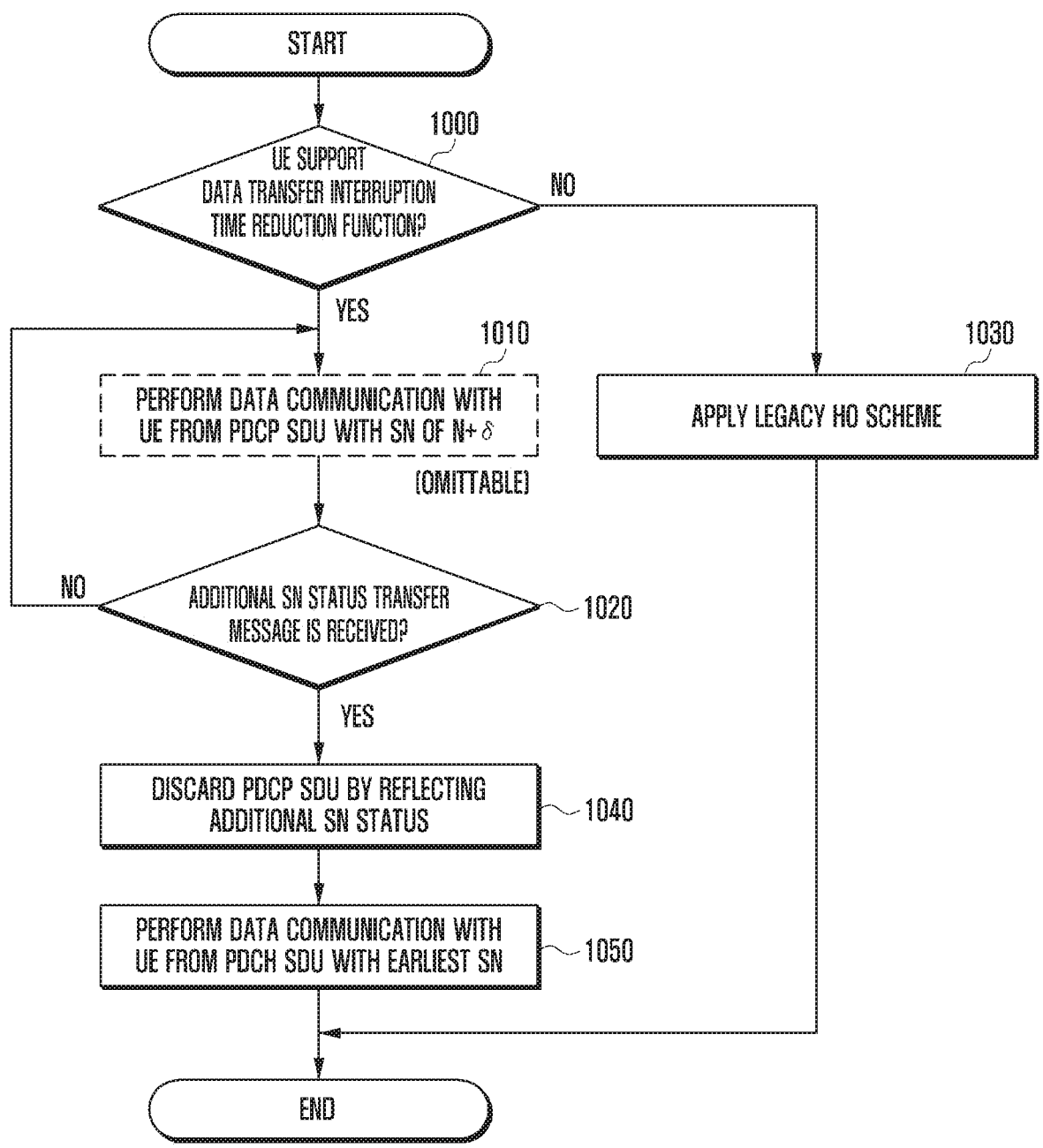
FIG. 10 is a flowchart illustrating a DL traffic transmission operation of the eNB B 130 during a HO.

FIG. 10 is a flowchart illustrating a DL traffic transmission operation of the eNB B 130 during a HO.

In reference to FIG. 10, the eNB B 130 receives SN status, data, estimated SN status, and information indicating whether the UE supports the data transfer interruption time reduction function from the eNB A 110 and determines at step 1000 whether the UE supports the data transfer interruption time reduction function. If it is determined that the corresponding UE supports the data transfer interruption time reduction function, the eNB B 130 starts, at step 1010, transmission to the UE from the PDCP SDU with the SN of N+δ at the eNB A 110 after receiving a HO complete message from the UE 140. As described above, this step may be omitted. Next, the eNB B 130 receives an additional SN status transfer message from the eNB A at step 1020 and discards, at step 1040, the stored PDCP SDUs based on the received additional SN status. Then, the eNB B 130 sends data to the UE 140 from the PDCP SDU with the earliest SN at step 1050.

If it is determined that the UE does not support the data transfer interruption time reduction function, a legacy HO scheme is applied to the HO for the UE between the eNB A and the eNB B at step 1030.

Figure 11:
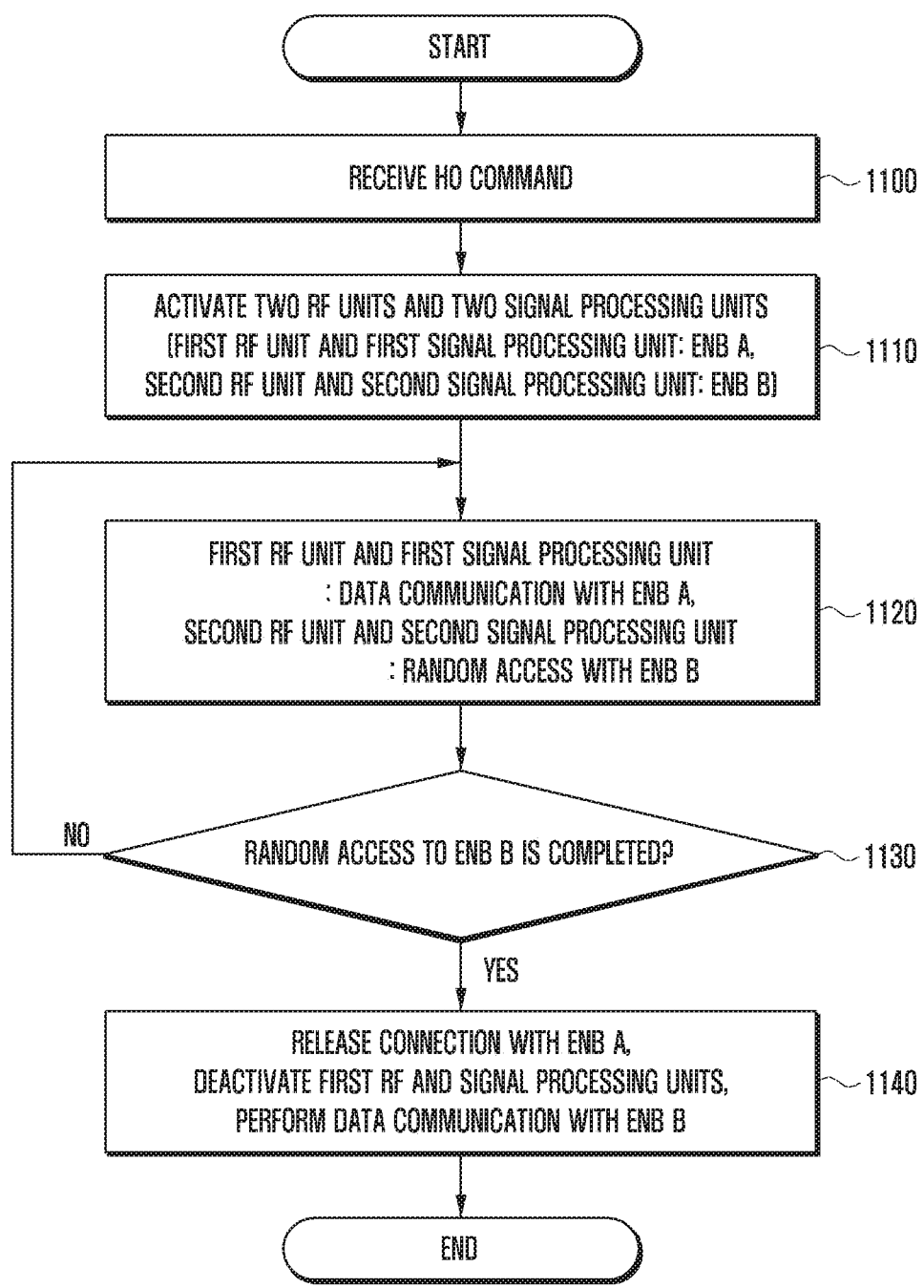
FIG. 11 is a flowchart illustrating an operation of the UE 140 supporting a data transfer interruption time reduction function.

FIG. 11 is a flowchart illustrating an operation of the UE 140 supporting a data transfer interruption time reduction function.

In reference to FIG. 11, the UE 140 receives a HO command message at step 1100. Next, the UE activates two RF units and two signal processing units at step 1110. The two RF units are a first RF unit and a second RF unit, and the two signal processing units are a first signal processing unit and a second processing unit, the first RF unit and signal processing unit being responsible for signal communication and signal processing with the eNB A 110 and the second RF unit and signal processing unit being responsible for signal communication and signal processing with the eNB B 130. That is, the first RF unit and the first signal processing unit are used for data communication with the eNB A 110, and the second RF unit and the second signal processing unit are used for a random access to the eNB B 130 at step 1120.

The UE determines at step 1130 whether the random access procedure with the eNB B is completed and, if the random access procedure is completed between the UE and the eNB B, releases the connection with the eNB A and deactivates the first RF unit and the first signal processing unit and performs data communication with the eNB B by means of the second RF unit and the second signal processing unit at step 114. If the random access procedure is not completed between the UE and the eNB B, the UE continues the data communication with the eNB A and the random access procedure with the eNB B at step 1120.

Figure 12:
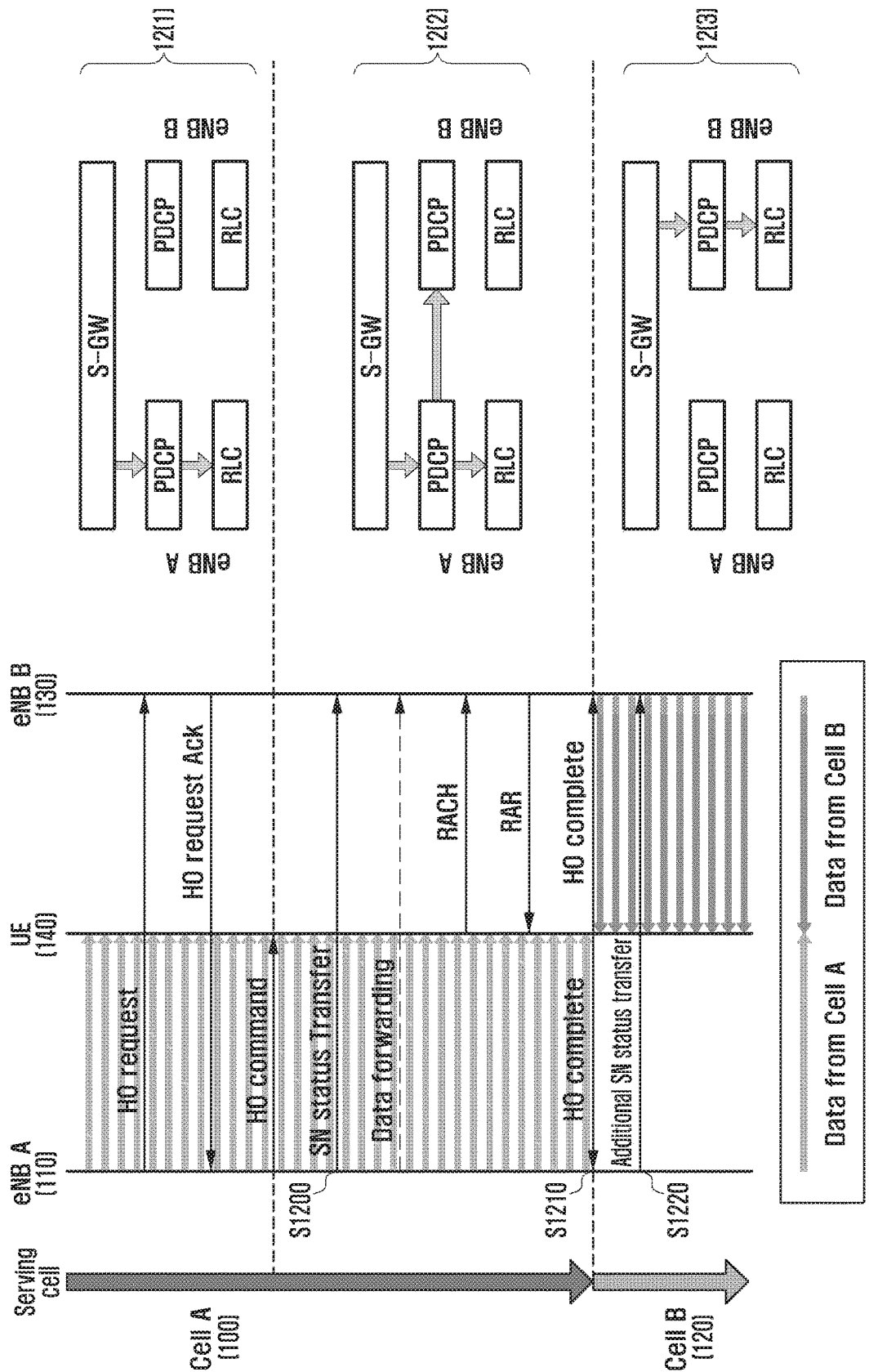
FIG. 12 is a diagram illustrating DL data flows among eNB A, eNB B, and a UE in a HO procedure according to an embodiment of the present invention.

FIG. 12 is a diagram illustrating DL data flows among eNB A, eNB B, and a UE in a HO procedure according to an embodiment of the present invention.

In reference to FIG. 12, the data flow during a period from the HO command message transmission/reception time point to the HO complete message transmission time point as denoted by reference number 12(2) in FIG. 12 differs from that as denoted by reference number 5(2) in FIG. 5 depicting the legacy HO scheme. In the embodiment of FIG. 12, the data flows from the PDCP layer of the eNB A 110 simultaneously to the PDCP layer of the eNB B 110 and the RLC layer of the eNB A 110 and then to the UE 140 as denoted by reference number 12(2) unlike the case as denoted by reference number 5(2) in FIG. 5 where the data received from the S-GW flows from the PDCP layer of the eNB A to the PDCP layer of the eNB B.

In comparison with FIG. 5, the eNB A 110 sends the eNB B 130 the information indicating whether the UE supports the data transfer interruption time reduction function along with the SN status transfer message at step S1200, the UE 140 sends the HO complete message to the eNB A 110 as well as the eNB B 130 at step S1210, and the eNB A 110 sends the additional SN status transfer message to the eNB B 130 at step S1220 in the embodiment of FIG. 12.

Figure 13:
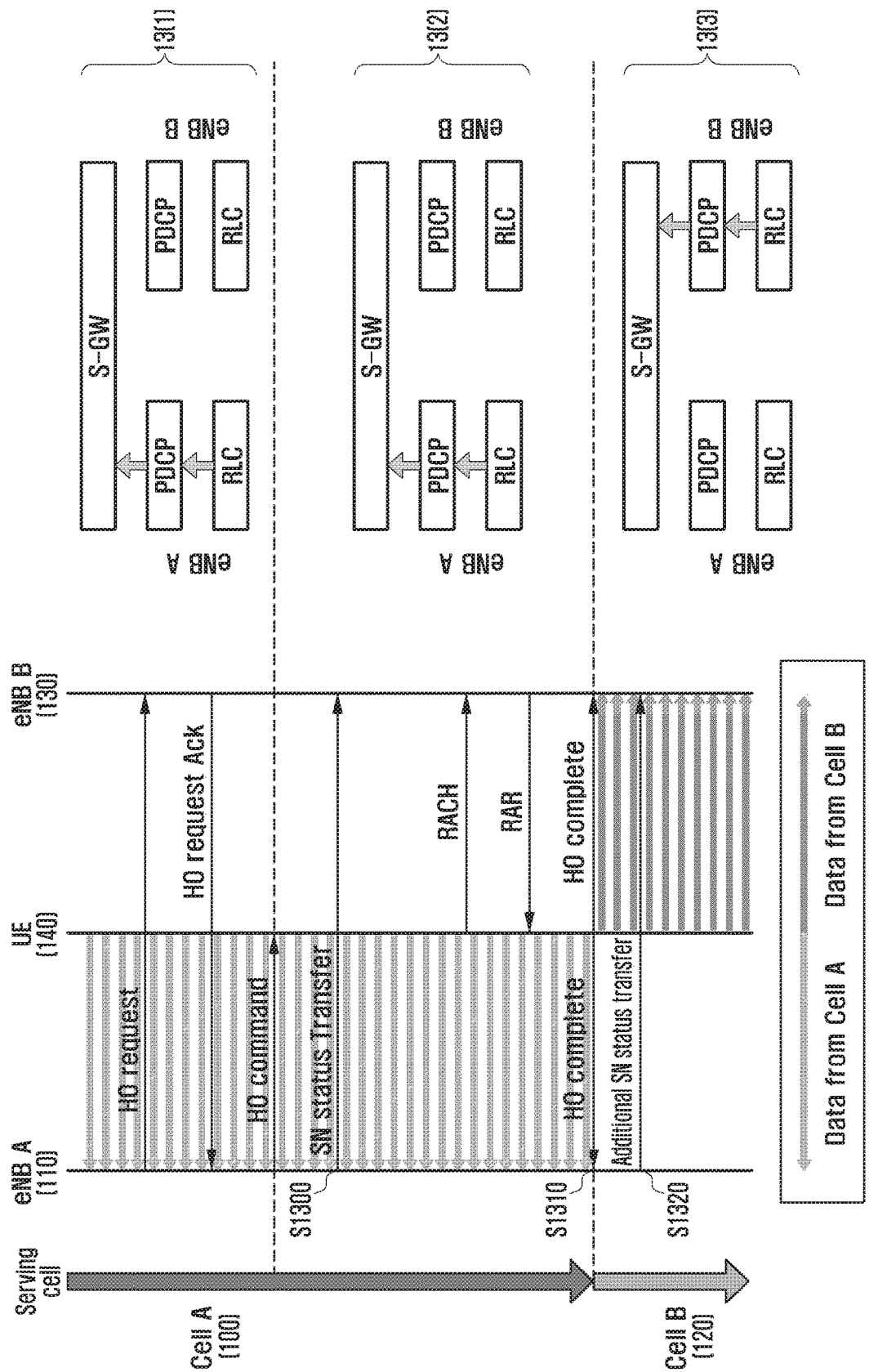
FIG. 13 is a diagram illustrating UL data flows among eNB A, eNB B, and a UE in a HO procedure according to an embodiment of the present invention.

FIG. 13 is a diagram illustrating UL data flows among eNB A, eNB B, and a UE in a HO procedure according to an embodiment of the present invention.

In reference to FIG. 13, the data flow during a period from the HO command message transmission/reception time point to the HO complete message transmission time point as denoted by reference number 12(2) in FIG. 12 differs from that as denoted by reference number 6(2) in FIG. 6 depicting the legacy HO scheme. In the embodiment of FIG. 13, the data transmitted by the UE flows to the S-GW through the RLC layer of the eNB A as denoted by reference number 13(2) unlike the case as denoted by reference number 6(2) in FIG. 6 where there is no data flow among the UE, the eNB A, and eNB B.

That is, the corresponding UE may perform a call connection procedure to access the cell B 120 in the course of the data communication with the cell A 100. The UE may attempt a random access in the cell B 120, receive an RAR in reply, exchange additionally necessary information, and finally send a HO complete message to the eNB B 130. Afterward, the UE resumes data communication with the cell B 120, and the eNB A 100 sends the eNB B 120 the information on the receipt of a PDCP protocol data unit (PDU) (which is interchangeably referred to as data packet) from the UE during a period from the HO command message transmission time point or SN status transfer message transmission time point to the Ho complete message reception time point; this scheme may reduce the data transfer interruption time during the HO for the UE dramatically.

In comparison with FIG. 6, the eNB A 110 sends the eNB B 130 the information indicating whether the UE supports the data transfer interruption time reduction function along with the SN status transfer message at step S1300, the UE 140 sends the HO complete message to the eNB A 110 as well as the eNB B 130 at step S1310, and the eNB A 110 sends the eNB B 130 the additional SN status transfer message at step S1320 in FIG. 13.

Figure 14:
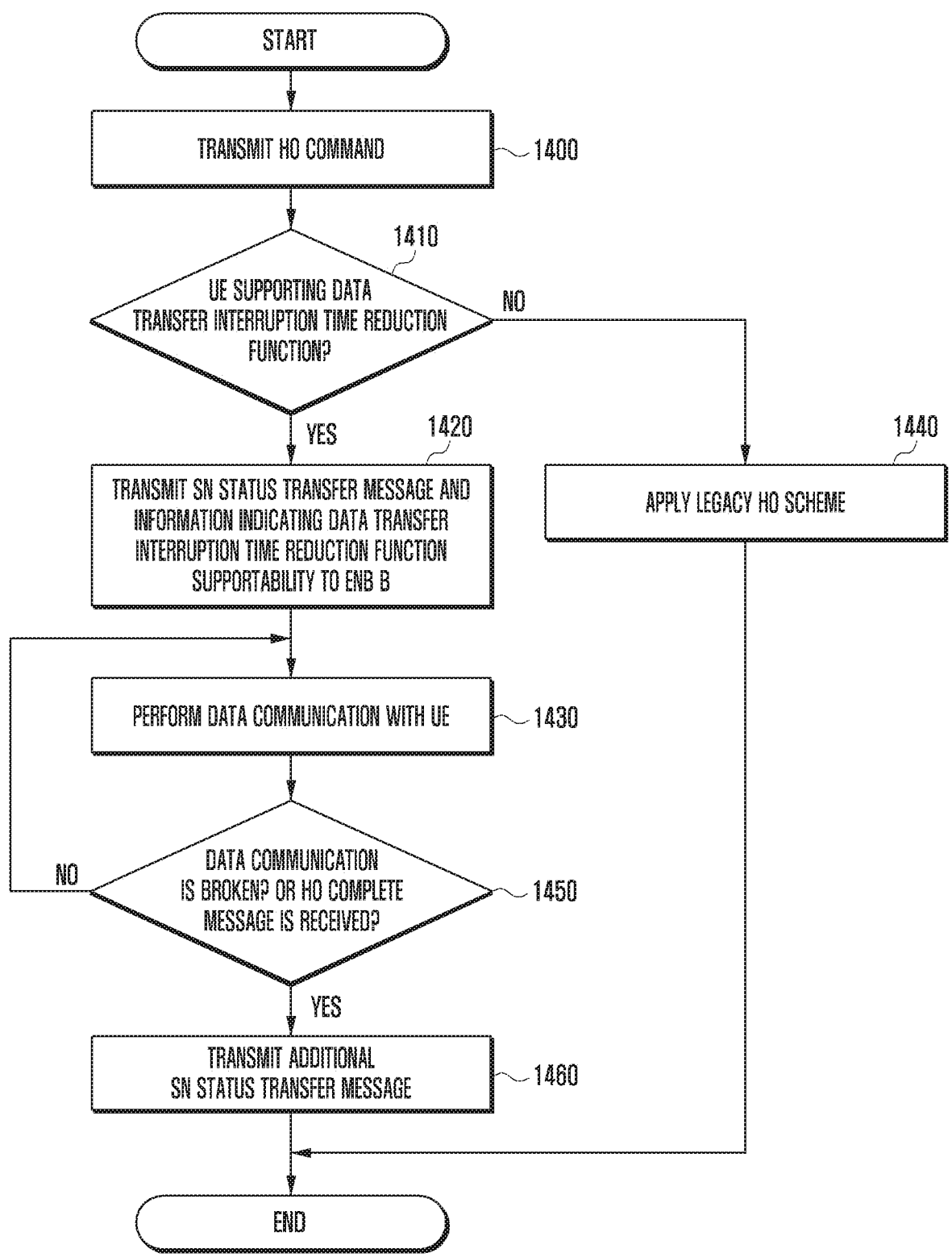
FIG. 14 is a flowchart illustrating a UL traffic reception operation of the eNB A 110 during a HO.

FIG. 14 is a flowchart illustrating a UL traffic reception operation of the eNB A 110 during a HO.

In reference to FIG. 14, the eNB A 110 sends the UE 140 a HO command message at step 1400. Next, the eNB A determines whether the corresponding UE supports the data transfer interruption time reduction function at step 1410 and, if so, sends the eNB B 130 the information indicating that the UE supports the data transfer interruption time reduction function along with SN status at step 1420. Afterward, the eNB A performs data communication with the UE, i.e., receives UL data from the UE, at step 1430, and determine at step 1440 whether the data communication with the UE is broken or a HO complete message is received. If the data communication with the UE is broken or a HO complete message is received, the eNB sends the eNB B 130 an additional SN status transfer message at step 1460. If neither the data communication with the UE is broken nor a HO complete message is received, the eNB A continue the data communication with the UE at step 1430.

If the corresponding UE does not support the data transfer interruption time reduction function, a legacy HO scheme is applied to the HO for the UE between the eNB A and the eNB B at step 1440.

In comparison with FIG. 9 depicting the case where the eNB A relays DL traffic, the eNB A neither calculates any estimated SN status nor perform data forwarding. This is because the UL traffic carries data from the UE.

Figure 15:
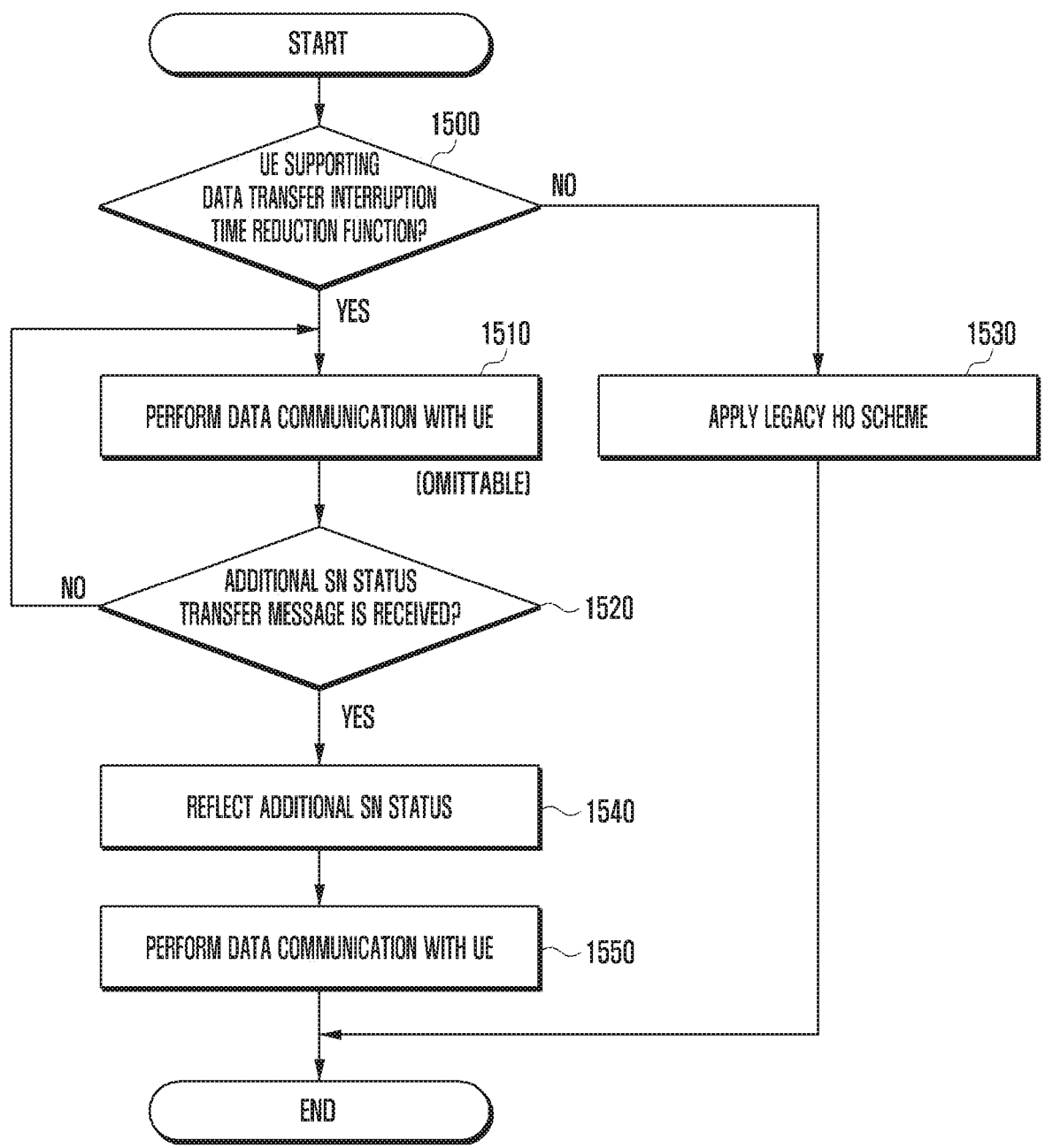
FIG. 15 is a flowchart illustrating a UL traffic reception operation of the eNB B 130 during a HO.

FIG. 15 is a flowchart illustrating a UL traffic reception operation of the eNB B 130 during a HO.

In reference to FIG. 15, the eNB B 130 determines at step 1500 whether a UE supports a data transfer interruption time reduction function based on the SN status and information indicating whether the corresponding UE 140 supports the data transfer interruption time reduction function that are received from the eNB A 110. If it is determined that the corresponding UE supports the data transfer interruption time reduction function, the eNB B 130 receives data from the UE after receiving a HO complete message from the UE 140, i.e., performs data communication with the UE, at step 1510. Next, the eNB B 130 determines at step 1520 whether an additional SN status transfer message is received from the eNB A and, if the additional SN status transfer message is received, reflects the received SN status at step 1540 and continues data communication with the UE at step 1550. If the additional SN status transfer message is not received, the eNB B continues data communication with the UE at step 1510.

If the corresponding UE does not support the data transfer interruption time reduction function, a legacy HO scheme is applied to the HO for the UE between the eNB A and the eNB B at step 1530.

Here, the operation of the UE that has been already described with reference to FIG. 11 is omitted. However, the UE 140 may perform PDCP PDU transmission subsequently to the transmission to the eNB A at the time point of releasing the connection with the eNB A 110 and starting data communication with the eNB B 130 and retransmit corresponding PDUs from the beginning.

Figure 16A:
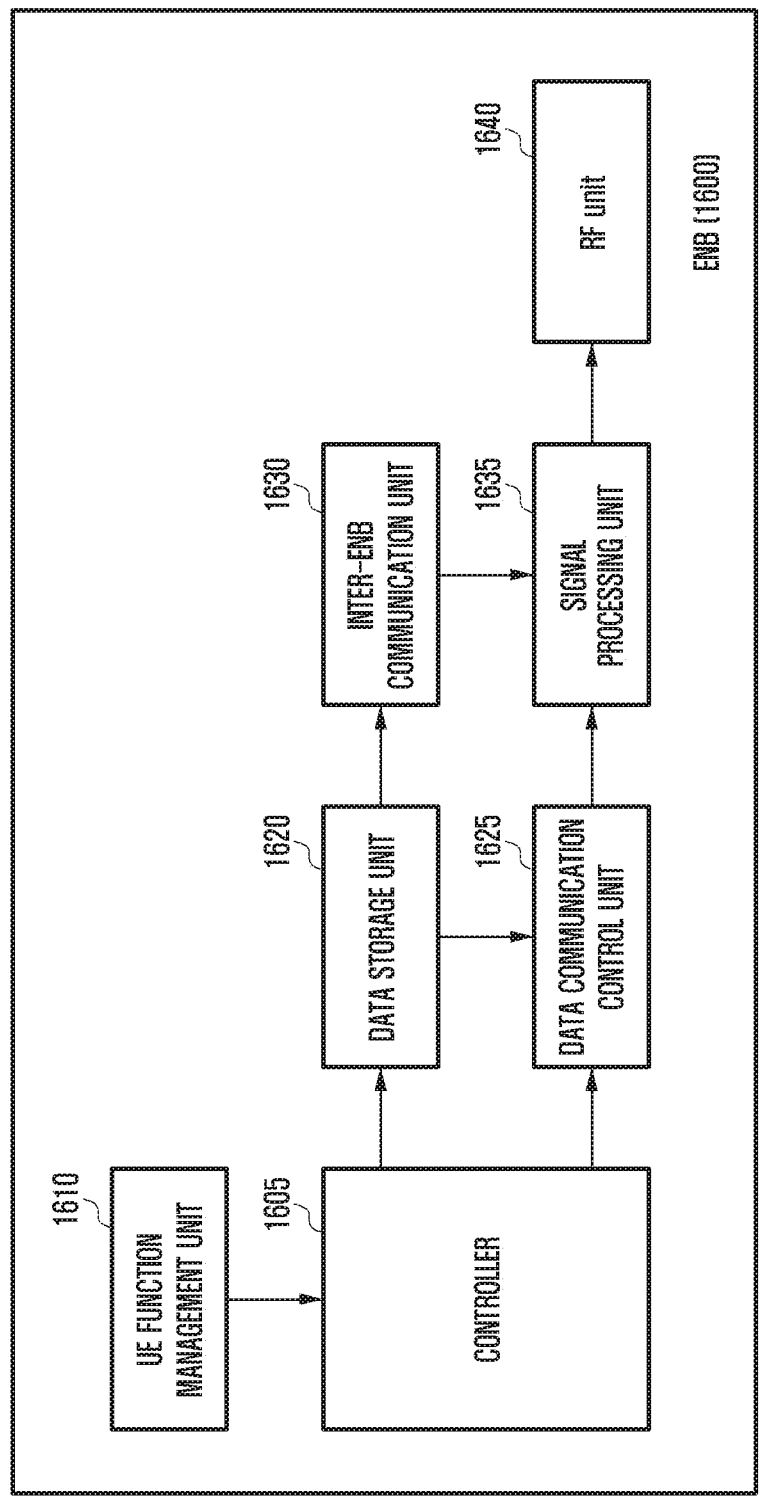
FIG. 16A is a block diagram illustrating a configuration of an eNB for performing the present invention.

FIG. 16A is a block diagram illustrating a configuration of an eNB for performing the present invention.

In reference to FIG. 16A, the eNB (base station) 1600 includes a UE function management unit 1610, a data storage unit 1620, an inter-eNB communication unit 1630, a data communication control unit 1625, a signal processing unit 1635, an RF unit 1640, and a controller 1605.

The individual blocks operate as follows. The UE function management unit 1620 manages whether the UEs being served by the eNB support the data transfer interruption time reduction function and notify the controller 1605 whether a UE for which a handover is required supports the data transfer interruption time reduction function. The data storage unit 1620 may store data to be delivered to all UEs and send the data to the data communication control unit 1625 and the inter-eNB communication unit 1630 under the instruction of the controller 1605.

The inter-eNB communication unit 1630 is responsible for communication with other eNBs and, if there are DL data remaining in the source cell during a HO, forwards the DL data to (an eNB controlling) the target cell such that the UE receives the DL data from the target cell. The data communication control unit 1625 controls to use constrained resources efficiently for transmitting data fetched from the data storage unit 1620 to the UE.

The signal processing unit 1635 generates an actual baseband signal in accordance with a resource allocation result from the data communication control unit 1625 in transmitting a DL signal and processes a signal received by the RF unit 1640 in receiving a UL signal. The RF unit 1640 transmits the baseband signal generated by the signal processing unit to the UE in a radio frequency band (radio band) in transmitting the DL signal and receives the signal transmitted by the UE in the radio frequency band in receiving the UL signal.

The controller 1605 controls functions for data communication with the UE and HO for the UE entirely. During a handover for an arbitrary UE, the controller 1605 sends the UE function management unit 1610 a request for indication on a data transfer interruption time reduction function supportability to receive the information on the data transfer interruption time reduction function supportability and, if the UE does not support the data transfer interruption time reduction function, stops data transfer from the data storage unit 1620 to the data communication control unit 1625 and control the inter-eNB communication unit 1630 to transmit an SN status and all of the data stored in the data storage unit 1620 to the target cell. If the UE supports the data transfer interruption time reduction function, the controller 1605 calculates an estimated SN status (N) and controls to continue data transfer from the data storage unit 1620 to the data communication control unit 1625 and to send the SN status, Estimated SN status, all data stored in the data storage unit 1620, and the additional SN status to the target cell by means of the inter-eNB communication unit 1630.

According to the 3GPP LTE standard, the data storage unit 1620 may be included in the RLC layer, the data communication control unit 1625 may be included in a media access control (MAC) layer, and the signal processing unit 1635 may be included in a physical layer. The inter-eNB communication unit 1630 may be a block that is responsible for X2 interface-based inter-eNB communication.

Figure 16B:
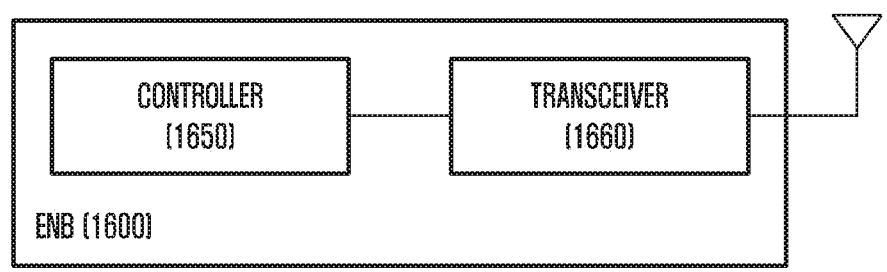
FIG. 16B is a block diagram illustrating another configuration of an eNB for performing the present invention.

FIG. 16B is a block diagram illustrating another configuration of an eNB for performing the present invention.

In reference to FIG. 16B, the eNB 1600 may include a controller 1650 and a transceiver 1660, and the controller 1650 may be responsible for the functions of the UE function management unit 1610, the data storage unit 1620, the inter-eNB communication unit 1630, the data communication control unit 1625, and the controller 1605 of FIG. 16A. The transceiver 1660 may be responsible for the functions of the signal processing unit 1635 and the RF unit 1640.

Figure 17A:
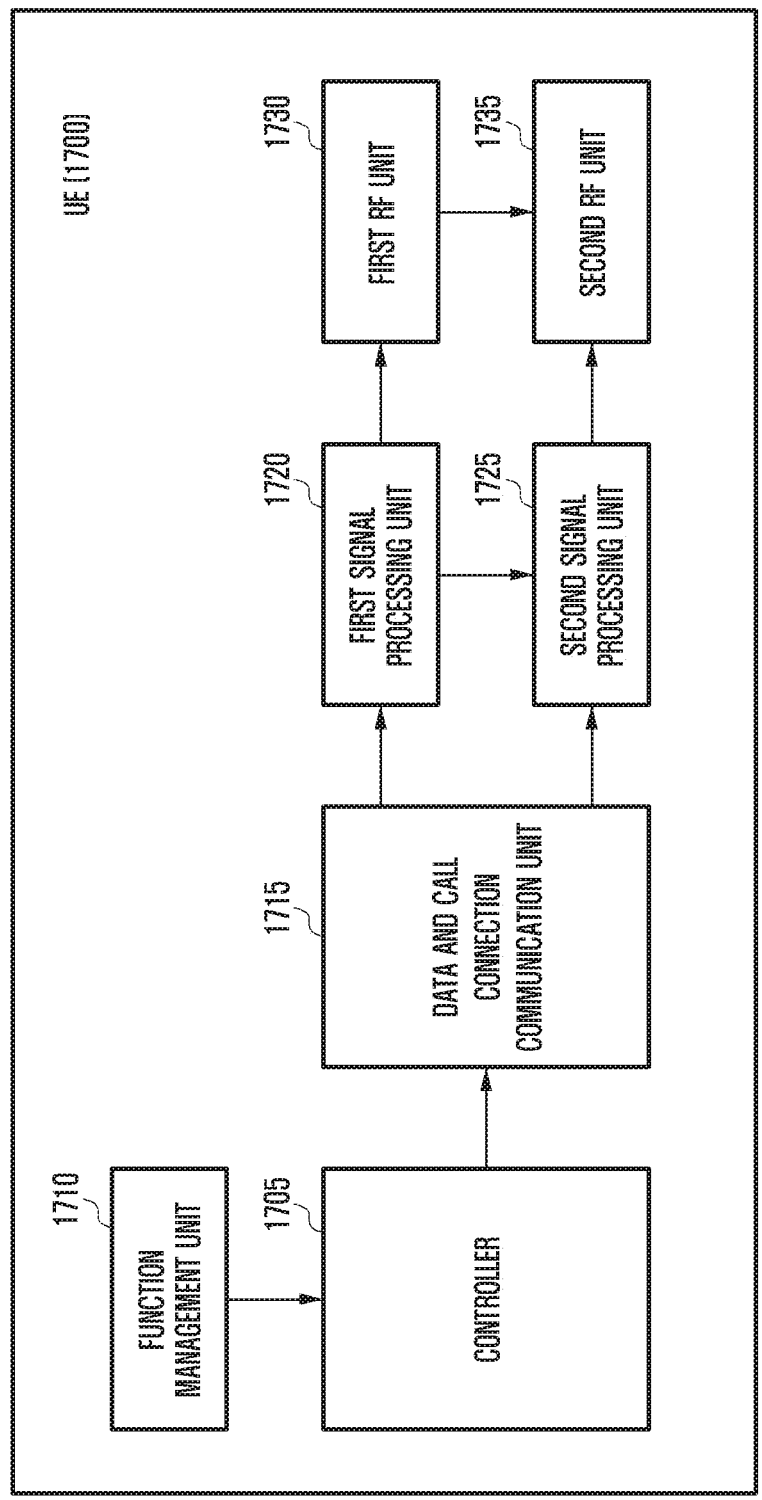
FIG. 17A is a block diagram illustrating a configuration of a UE supporting a data transfer interruption time reduction function for performing the present invention.

FIG. 17A is a block diagram illustrating a configuration of a UE supporting a data transfer interruption time reduction function for performing the present invention.

In reference to FIG. 17A, the UE 1710 includes a function management unit 1710, a first RF unit 1730, a second RF unit 1735, a first signal processing unit 1720, a second signal processing unit 1725, a data and call connection communication unit 1715, and a controller 1705.

The individual blocks operate as follows. The function management unit 1710 verifies that the corresponding UE supports the data transfer interruption time reduction function and notifies the controller 1705 that the UE supports the data transfer interruption time reduction function, which is notified to an eNB. The RF units 1730 and 1735 receive signals transmitted by the eNB through a radio frequency band in receiving DL signals and send the eNB the baseband signals generated by the first and second signal processing units 1720 and 1725 through the radio frequency band in transmitting UL signals. During a handover, the first RF unit 1730 of the two RF units is responsible for the signal of a source cell, and the second RF unit 1735 is responsible for a physical signal of a target cell. The signal processing units 1720 and 1725 process the signals received by the RF units in receiving DL signals and generate actual baseband signals in transmitting UL signals. During a handover, the first signal processing unit of the two signal processing units is responsible for the physical signals of the source cell, and the second signal processing unit is responsible for the physical signals of the target cell.

The data and call connection communication unit 1715 is responsible for data communication and call connection communication with the eNB. The controller 1705 controls the signal processing units 1720 and 1725 to operate for the purposes such as call connection and data communication. That is, the call connection is controlled by means of the second signal processing unit 1725 so as to use the signal of the first signal processing unit 1720 before transmitting a HO complete message and then the signal of the second signal processing unit 1725 after transmitting the HO complete message. Also, the UL transmission signal is processed by the first signal processing unit 1720 before the HO complete message transmission and then the second signal processing unit 1725 after the HO complete message transmission.

The controller 1705 controls functions for data communication with the eNB and HO entirely. When a HO procedure is initiated, the controller activates the signal processing units 1720 and 1725 for additional use to process the signals of the source and source cells, respectively. The controller is responsible for controlling the data and call connection communication unit 1715 in accordance with the roles of the signal processing units 1720 and 1725.

Figure 17B:
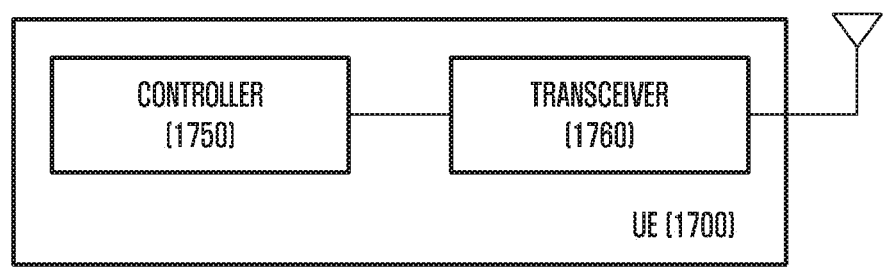
FIG. 17B is a block diagram illustrating another configuration of a UE supporting a data transfer interruption time reduction function for performing the present invention.

FIG. 17B is a block diagram illustrating another configuration of a UE supporting a data transfer interruption time reduction function for performing the present invention.

In reference to FIG. 17B, the UE 1700 includes a controller 1750 and a transceiver 1760. The controller 1750 may be responsible for the functions of the function management unit 1710, the data and call connection communication unit 1715, and the controller 1705. The transceiver 1760 may be responsible for the functions of the first RF unit 1730, the second RF unit 1735, the first signal processing unit 1720, and the second signal processing unit 1725.

The present invention is capable of minimizing the data transfer interruption time during a HO procedure for switching the cell serving a UE in a cellular radio communication network. In detail, the present invention is capable of improving quality of a service being provided to a mobile UE by minimizing the data transfer interruption time.

The invention claimed is:

1. A method performed by a terminal in a communication system, the method comprising:

receiving, from a source base station, a handover command message indicating a handover from the source base station to a target base station;
performing a random access procedure with the target base station while communicating data with the source base station based on a capability of the terminal; and
transmitting a handover complete message to the target base station,
wherein a first status transfer message and data to be forwarded from the source base station to the target base station are transmitted from the source base station to the target base station after receiving the handover command message and before transmitting the handover complete message, and
wherein a second status transfer message is transmitted from the source base station to the target base station after transmission of the handover complete message, in response to a message transmitted from the target base station to the source base station,
wherein the second status transfer message is used to identify the earliest downlink packet data convergence protocol (PDCP) service data unit (SDU) to be transmitted to the terminal by the target base station, and
wherein the capability indicates the terminal supports a handover procedure that maintains a connection with the source base station after reception of the handover command message and until releasing the source base station.

2. The method of claim 1, further comprising:
receiving, from the source base station, downlink data after receiving the handover command message until the connection with the source base station is released; and
receiving, from the target base station, downlink data after transmitting the handover complete message.

3. The method of claim 1, further comprising:
transmitting, to the source base station, uplink data after receiving the handover command message until the handover complete message is transmitted; and
transmitting, to the target base station, uplink data after transmitting the handover complete message.

4. The method of claim 1, wherein the first status transfer message and the second status transfer message are associated with a sequence number of packet data convergence protocol (PDCP).

5. A method performed by a source base station in a communication system, the method comprising:
transmitting, to a terminal, a handover command message indicating a handover from the source base station to a target base station;
transmitting, to the target base station, a first status transfer message and data to be forwarded to the target base station after transmitting the handover command message and before a handover complete message is transmitted from the terminal to the target base station, while communicating data with the terminal based on a capability of the terminal; and
transmitting, to the target base station, a second status transfer message in response to a message received from the target base station, after the handover complete message is transmitted from the terminal to the target base station,
wherein the second status transfer message is used to identify the earliest downlink packet data convergence protocol (PDCP) service data unit (SDU) to be transmitted to the terminal by the target base station, and
wherein the capability indicates the terminal supports a handover procedure that maintains a connection with the source base station after reception of the handover command message and until releasing the source base station.

6. The method of claim 5, further comprising:
transmitting, to the terminal, downlink data after receiving the handover command message until the connection with the source base station is released.

7. The method of claim 5, further comprising:
receiving, from the terminal, uplink data uplink data after transmitting the handover command message until the handover complete message is transmitted from the terminal to the target base station.

8. A method performed by a target base station in a communication system, the method comprising:
receiving, from a source base station, a first status transfer message and data to be forwarded from the source base station after a handover command message is transmitted from the source base station to a terminal and before receiving a handover complete message from the terminal;
receiving, the handover complete message from the terminal; and
receiving, from the source base station, based on a capability of the terminal, a second status transfer message in response to a message transmitted to the source base station after receiving the handover complete message,
wherein the second status transfer message is used to identify the earliest downlink packet data convergence protocol (PDCP) service data unit (SDU) to be transmitted to the terminal by the target base station, and
wherein the capability indicates the terminal supports a handover procedure that maintains a connection with the source base station after reception of the handover command message and until releasing the source base station.

9. The method of claim 8, further comprising:
transmitting, to the terminal, downlink data after receiving the handover complete message.

10. The method of claim 8, further comprising:
receiving, from the terminal, uplink data after receiving the handover complete message.

11. A terminal in a communication system, the terminal comprising:
a transceiver; and
a controller configured to:
receive, from a source base station, a handover command message indicating a handover from the source base station to a target base station,
perform a random access procedure with the target base station while communicating data with the source base station based on a capability of the terminal, and
transmit a handover complete message to the target base station,
wherein a first status transfer message and data to be forwarded from the source base station to the target base station are transmitted from the source base station to the target base station after receiving the handover command message and before transmitting the handover complete message, and
wherein a second status transfer message is transmitted from the source base station to the target base station after transmission of the handover complete message, in response to a message transmitted from the target base station to the source base station, wherein the second status transfer message is used to identify the earliest downlink packet data convergence protocol (PDCP) service data unit (SDU) to be transmitted to the terminal by the target base station, and wherein the capability indicates the terminal supports a handover procedure that maintains a connection with the source base station after reception of the handover command message and until releasing the source base station.

12. The terminal of claim 11, wherein the controller is further configured to:
receive, from the source base station, downlink data after receiving the handover command message until the connection with the source base station is released, and
receive, from the target base station, downlink data after transmitting the handover complete message.

13. The terminal of claim 11, wherein the controller is further configured to:
transmit, to the source base station, uplink data after receiving the handover command message until the handover complete message is transmitted, and
transmit, to the target base station, uplink data after transmitting the handover complete message.

14. The terminal of claim 11, wherein the first status transfer message and the second status transfer message are associated with a sequence number of packet data convergence protocol (PDCP).

15. A source base station in a communication system, the source base station comprising:
a transceiver; and
a controller configured to:
transmit, to a terminal, a handover command message indicating a handover from the source base station to a target base station,
transmit, to the target base station, a first status transfer message and data to be forwarded to the target base station after transmitting the handover command message and before a handover complete message is transmitted from the terminal to the target base station, while communicating data with the terminal based on a capability of the terminal, and
transmit, to the target base station, a second status transfer message in response to a message received from the target base station, after the handover complete message is transmitted from the terminal to the target base station,
wherein the second status transfer message is used to identify the earliest downlink packet data convergence protocol (PDCP) service data unit (SDU) to be transmitted to the terminal by the target base station, and wherein the capability indicates the terminal supports a handover procedure that maintains a connection with the source base station after reception of the handover command message and until releasing the source base station.

16. The source base station of claim 15, wherein the controller is further configured to transmit, to the terminal, downlink data after receiving the handover command message until the connection with the source base station is released.

17. The source base station of claim 15, wherein the controller is further configured to receive, from the terminal, uplink data uplink data after transmitting the handover command message until the handover complete message is transmitted from the terminal to the target base station.

18. A target base station in a communication system, the target base station comprising:
a transceiver; and
a controller configured to:
receive, from a source base station, a first status transfer message and data to be forwarded from the source base station after a handover command message is transmitted from the source base station to a terminal and before receiving a handover complete message from the terminal,
receive, the handover complete message from the terminal, and
receive, from the source base station, based on a capability of the terminal, a second status transfer message in response to a message transmitted to the source base station after receiving the handover complete message,
wherein the second status transfer message is used to identify the earliest downlink packet data convergence protocol (PDCP) service data unit (SDU) to be transmitted to the terminal by the target base station, and
wherein the capability indicates the terminal supports a handover procedure that maintains a connection with the source base station after reception of the handover command message and until releasing the source base station.

19. The target base station of claim 18, wherein the controller further configured to transmit, to the terminal, downlink data after receiving the handover complete message.

20. The target base station of claim 18, wherein the controller further configured to receive, from the terminal, uplink data after receiving the handover complete message.

* * * * *